US012809389B2

(12) United States Patent
Uchida et al.

(10) Patent No.: US 12,809,389 B2
(45) Date of Patent: Nov. 24, 2026

(54) INFORMATION PROCESSING APPARATUS, SYSTEM, AND STORAGE MEDIUM

(71) Applicant: KABUSHIKI KAISHA TOSHIBA, Tokyo (JP)

(72) Inventors: Daisuke Uchida, Kawasaki Kanagawa (JP); Satoshi Takaya, Kawasaki Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 139 days.

(21) Appl. No.: 18/818,605

(22) Filed: Aug. 29, 2024

(65) Prior Publication Data

US 2025/0189974 A1 Jun. 12, 2025

(30) Foreign Application Priority Data

Dec. 7, 2023 (JP) ................................ 2023-206885

(51) Int. Cl.
*G05D 1/247* (2024.01)
*G05D 105/28* (2024.01)
(Continued)

(52) U.S. Cl.
CPC ........... *G05D 1/247* (2024.01); *H04B 17/201* (2023.05); *G05D 2105/28* (2024.01); *G05D 2107/70* (2024.01); *G05D 2111/30* (2024.01)

(58) Field of Classification Search
CPC ............... G05D 1/247; G05D 2105/28; G05D 2107/70; G05D 2111/30; G05D 1/246;
(Continued)

(56) References Cited

U.S. PATENT DOCUMENTS

2015/0312774 A1* 10/2015 Lau ...................... G05D 1/0274 455/446
2019/0041225 A1* 2/2019 Winkle ............. G01C 21/3453
(Continued)

FOREIGN PATENT DOCUMENTS

CN 104581644 A * 4/2015 ........... H04W 24/02
JP 2018207154 A 12/2018
(Continued)

OTHER PUBLICATIONS

Machine translation of CN-104581644-A (Year: 2015).*
(Continued)

*Primary Examiner* — Erin M Piateski
*Assistant Examiner* — Caitlin R McCleary
(74) *Attorney, Agent, or Firm* — Holtz, Holtz & Volek PC

(57) ABSTRACT

According to one embodiment, an information processing apparatus includes a processor. The processor is configured to acquire first received power on a route of a moving vehicle passing between a signal emission source and a radio wave shield, based on radio waves emitted from the signal emission source, in a state in which the radio wave shield is arranged at a first position, acquire second received power, which is a radio wave emitted from the signal emission source and measured on the route, in a state in which the radio wave shield is not arranged at the first position, and set a part of an area on the route as a target area based on an index related to fluctuation between the first received power and the second received power.

18 Claims, 18 Drawing Sheets

(51) Int. Cl.

| | |
|---|---|
| ***G05D 107/70*** | (2024.01) |
| ***G05D 111/30*** | (2024.01) |
| ***H04B 17/20*** | (2015.01) |

(58) Field of Classification Search

CPC .. G05D 2101/15; G05D 1/226; G05D 1/6445; G05D 1/646; G05D 1/6987; G05D 2109/10; H04B 17/201; H04B 17/318

See application file for complete search history.

(56) References Cited

U.S. PATENT DOCUMENTS

| | | | | |
|---|---|---|---|---|
| 2021/0014643 | A1 | 1/2021 | Kuroda et al. | |
| 2021/0299883 | A1* | 9/2021 | Otsuki | B25J 9/163 |
| 2023/0155422 | A1* | 5/2023 | Nishikawa | H02J 50/60 307/104 |
| 2024/0080119 | A1 | 3/2024 | Uchida et al. | |
| 2024/0264330 | A1 | 8/2024 | Uchida et al. | |
| 2024/0280991 | A1 | 8/2024 | Uchida et al. | |
| 2024/0393131 | A1 | 11/2024 | Uchida et al. | |

FOREIGN PATENT DOCUMENTS

| | | | |
|---|---|---|---|
| JP | 2019192030 | A | 10/2019 |
| JP | 2024035521 | A | 3/2024 |
| JP | 2024112075 | A | 8/2024 |
| JP | 2024116658 | A | 8/2024 |
| JP | 2024168870 | A | 12/2024 |

OTHER PUBLICATIONS

U.S. Appl. No. 18/582,686, First Named Inventor: Daisuke Uchida; Title: "Information Processing Apparatus, System, and Storage Medium"; filed Feb. 21, 2024.

Hattori, et al., "A Proposal of Near-Infrared Light Material Discrimination Method by PLS Regression Analysis and Informative Wavelength Selection", Journal of the Japan Society for Precision Engineering (vol. 83, No. 2), 2017, pp. 158-166, DOI: 10.2493/jjspe.83.158.

Kembhavi, et al., "Vehicle Detection Using Partial Least Squares", IEEE Transactions on Pattern Analysis and Machine Intelligence (vol. 33, No. 6), 2011, 1250-1265, DOI: 10.1109/TPAMI.2010.182.

Wold, et al., "PLS-regression: a basic tool of chemometrics", Chemometrics and Intelligent Laboratory Systems (vol. 58, No. 2), 2001, pp. 109-130, DOI: 10.1016/S0169-7439(01)00155-1.

* cited by examiner

| Moving vehicle ID | Number of laps | Received power | Time | Position |
|---|---|---|---|---|
| 001 | 1 | -60dBm | hh:mm:ss | Position 1 |
| 002 | 1 | -50dBm | hh:mm:ss | Position 2 |
| ⋮ | ⋮ | ⋮ | ⋮ | ⋮ |

INFORMATION PROCESSING APPARATUS, SYSTEM, AND STORAGE MEDIUM

CROSS-REFERENCE TO RELATED APPLICATIONS

This application is based upon and claims the benefit of priority from Japanese Patent Application No. 2023-206885, filed Dec. 7, 2023, the entire contents of which are incorporated herein by reference.

FIELD

Embodiments described herein relate generally to an information processing apparatus, a system, and a storage medium.

BACKGROUND

In recent years, controlling a mobile body (for example, a mobile robot or the like) moving in a predetermined space by, for example, executing wireless communication has been known. In this case, a moving vehicle is controlled to move, for example, along a route from a start point to a goal point set on a map of a space where the mobile body moves, based on a control signal for controlling the mobile body.

Incidentally, the above-described control signal is emitted from an antenna (signal emission source) by a radio wave and, when an object that shields the radio wave (hereinafter, referred to as a radio wave shield) is arranged in the space where the moving vehicle moves, an insensitive area in which received power is lowered occurs at a position facing the antenna with the radio wave shield interposed therebetween (i.e., an area behind the radio wave shield when viewed from the antenna). In this case, a route which avoids the insensitive area can be selected to move the moving vehicle along the route.

If the above-described radio wave shield is removed, the insensitive area is eliminated and the moving vehicle does not need to move while avoiding the insensitive area. However, the moving vehicle cannot be efficiently controlled unless the elimination of the insensitive area (i.e., presence or absence of the radio wave shield) is recognized.

DETAILED DESCRIPTION

Figure 1:
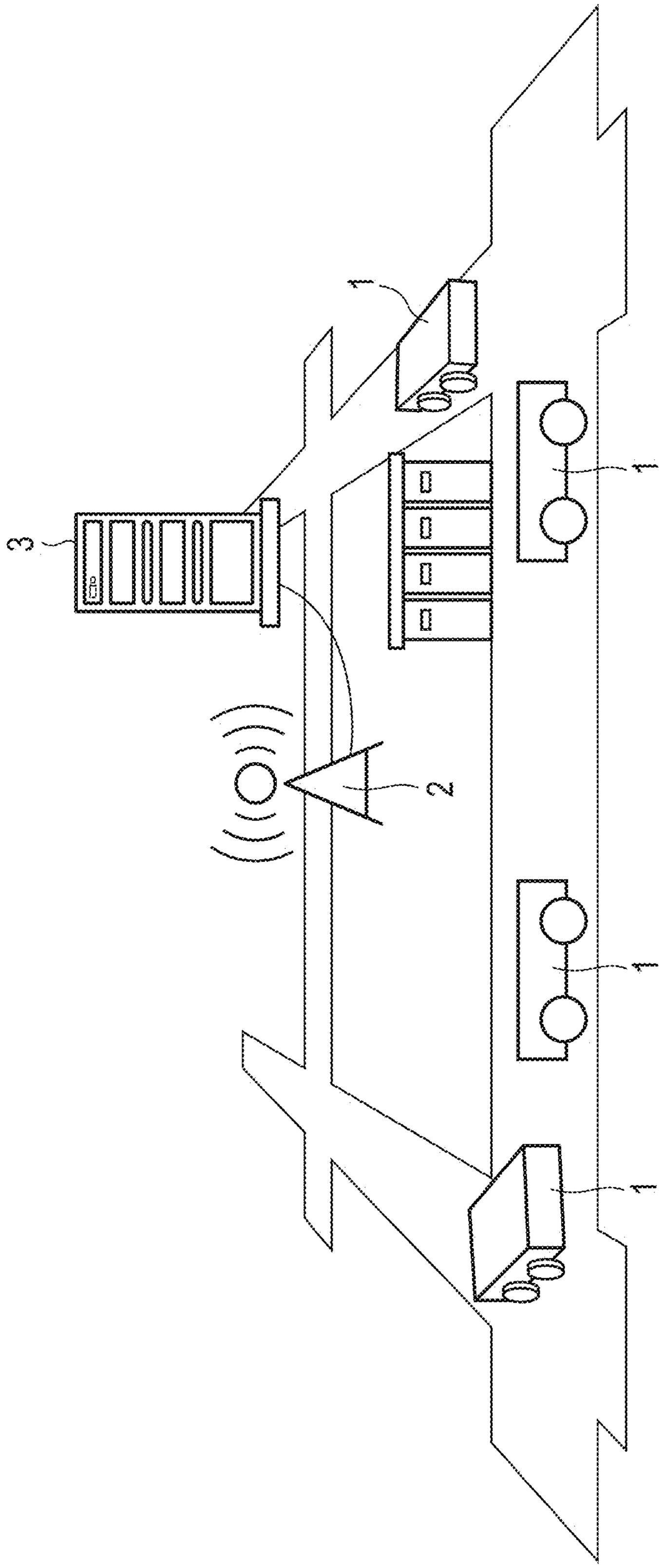
FIG. 1 is a diagram showing an example of a local 5G system applied to an embodiment.

In general, according to one embodiment, an information processing apparatus includes a processor. The processor is configured to acquire first received power on a route of a moving vehicle passing between a signal emission source and a radio wave shield, based on radio waves emitted from the signal emission source, in a state in which the radio wave shield for blocking the radio waves is arranged at a first position. The processor is configured to acquire second received power, which is a radio wave emitted from the signal emission source and measured on the route in a state in which the radio wave shield is not arranged at the first position. The processor is configured to set a part of an area on the route as a target area used for processing related to control of the moving vehicle, based on an index related to fluctuation between the first received power and the second received power.

Various embodiments will be described with reference to the accompanying drawings.

An information processing apparatus according to the present embodiment is used to control a moving vehicle (mobile robot) that moves in a predetermined space (hereinafter referred to as a target space) such as a factory or a warehouse.

First, a scenario in which the information processing apparatus according to the present embodiment is applied will be described. When a moving vehicle moves in a straight line along a passage in the target space, the control of the moving vehicle may be simple. However, for example, when the passage arranged in the target space is curved or avoids an object arranged in the target space, more advanced control is required.

Incidentally, when such control of the moving vehicle is performed by wire (i.e., a control signal for controlling the moving vehicle is transmitted by wire), problems arise that a range in which the moving vehicle can move is limited, the moving vehicle becomes out of control because of disconnection, and wiring work is complicated. In particular, when a large number of moving vehicles move in the target space, these problems become remarkable.

In contrast, when the control of the moving vehicles is performed in a wireless manner (i.e., the moving vehicles are controlled in a wireless manner), the above-described problems can be solved. For example, local 5G can be used for such wireless control of the moving vehicles. Since the local 5G is a 5G network that can be individually used by, for example, companies and the like and can achieve high speed, low delay, and multiple simultaneous connections, the network is useful in an environment in which a large number of moving vehicles moving in the target space are controlled in a wireless manner. Incidentally, a wireless LAN can also be used for wireless control of the moving vehicles.

The above-described moving vehicles can be roughly divided into moving vehicles that operate autonomously and moving vehicles that operate based on commands (control signals) from outside. The moving vehicles that operate autonomously are useful since each of the moving vehicles can operate by determining the situation. However, the moving vehicles are high in cost and their application to a case in which a large number of moving vehicles are arranged in the target space is difficult. On the other hand, if the moving vehicles operate based on commands from the outside as described above, the total cost of the system including the moving vehicles, information processing apparatus, and the like can be reduced by integrating the functions for controlling a large number of moving vehicles into a single apparatus (for example, information processing apparatus). In addition, since the information of a large number of moving vehicles moving in the target space can be collectively managed, the moving vehicles can be managed relatively easily. Incidentally, the fact that information of a large number of moving vehicles can be collectively recognized is also advantageous from the viewpoint of the optimization of movement of the whole moving vehicles.

Applying a local 5G system (cellular system) that performs terminal-side control on the base station side to the present embodiment as shown in FIG. 1 is assumed below.

In the example shown in FIG. 1, a situation in which a plurality of moving vehicles 1 move in the target space is assumed. Each of the plurality of mobile vehicles 1 is equipped with (a mobile terminal or the like including) a radio device and is communicably connected to a base station 2. In addition, an information processing apparatus 3 is connected to the base station 2, and control signals for controlling the moving vehicles 1 generated by the information processing apparatus 3 are transmitted from (an antenna installed in) the base station 2 to the moving vehicles 1. In other words, it is considered that the moving vehicles 1 are communicably connected to the information processing apparatus 3 via the base station 2. The moving vehicles 1 can thereby move in the target space, based on the control signals generated by the information processing apparatus 3.

It is assumed in FIG. 1 that the mobile vehicle 1 is an autonomous mobile robot (AMR) and that the information processing apparatus 3 is, for example, a server device referred to as mobile edge computing (MEC). The information processing apparatus 3 may be a server apparatus that provides a cloud computing service.

Figure 2:
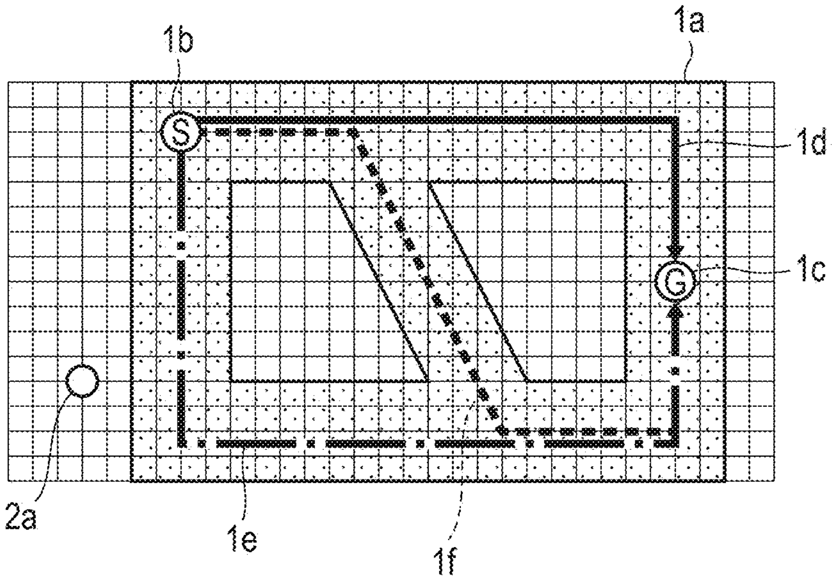
FIG. 2 is a diagram showing an example of a target space.

It is assumed that the moving vehicle 1 is controlled to move in the target space shown in FIG. 2. A situation in which, for example, the moving vehicle 1 moves from a start point 1*b* to a goal point 1*c* along a passage in the target space (for example, a travel route provided in a factory or a warehouse) 1*a* in order to carry (convey) a load such as a corrugated box is assumed here. The moving vehicle may perform work other than transporting the load from the start point 1*b* to the goal point 1*c*.

In this case, the routes for moving from the start point 1*b* to the goal point 1*c* include a route 1*d* corresponding to the shortest route, a route 1*e* corresponding to the longest route, and a route 1*f* corresponding to an intermediate route of the shortest route and the longest route.

According to the above-described target space shown in FIG. 2, the moving vehicle 1 can be controlled to move efficiently from the start point 1*b* to the goal point 1*c* by selecting the route 1*d* (i.e., the shortest route) among the routes 1*d* to 1*f*. The control signal for controlling the moving vehicle 1 is thus emitted from, for example, an antenna 2*a* (signal emission source) installed at the base station 2 to the moving vehicle 1. The antenna 2*a* is arranged in, for example, the target space. Incidentally, it has been described that the moving vehicle 1 moves from the start point 1*b* to the goal point 1*c* in order to carry a load, and a load is carried not only once, but the moving vehicle 1 is assumed to repeat an operation of carrying the load from the start point 1*b* to the goal point 1*c*, then returning to the start point 1*b* again, and carrying another load from the start point 1*b* to the goal point 1*c*. In addition, a plurality of moving vehicles 1 may carry loads from the start point 1*b* to the goal point 1*c*.

When the target space in which the moving vehicle 1 moves is, for example, a factory or a warehouse, it is assumed that the arrangement of obstacles (such as a corrugated box carried by the moving vehicle 1) in the target space changes as the time elapses. It is assumed that an obstacle 1*g* is arranged in the target space as shown on the left side of FIG. 3 in a situation in which, for example, the moving vehicles 1 repeatedly carry loads from the start point 1*b* to the goal point 1*c* shown in FIG. 2 as described above (for example, a plurality of moving vehicles 1 sequentially move along a determined route).

If signals (for example, control signals, and the like) are emitted by radio waves from the antenna 2*a* and if this obstacle 1*g* is a radio wave shield (for example, a corrugated box in which an object blocking the radio waves, such as metal is packed), the radio waves emitted from the antenna 2*a* are shielded by the obstacle 1*g*, and the situation related to the radio wave shielding in an area 1*h* opposed to the antenna 2*a* across the obstacle 1*g* (hereinafter referred to as a radio wave propagation environment) is deteriorated. In this case, the area 1*h* corresponds to an insensitive area with reduced received power.

Figure 3:
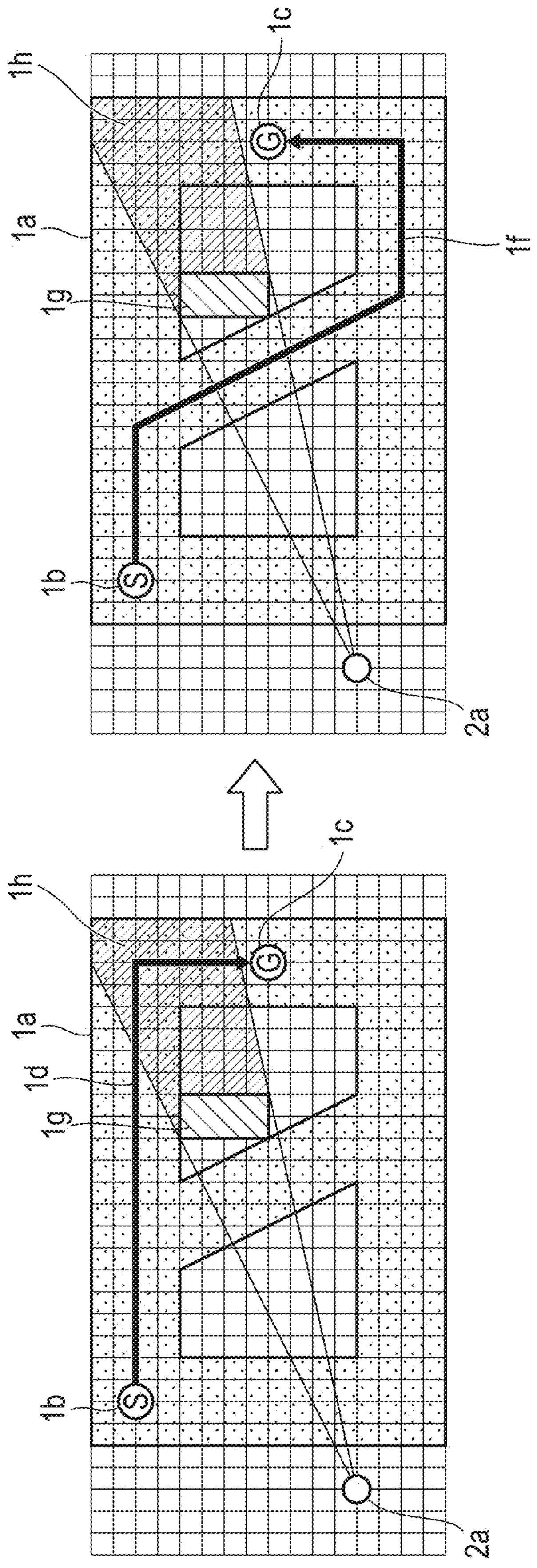
FIG. 3 is a diagram illustrating an example of an environment assumed in the embodiment.

In the example shown in FIG. 3, the area where the radio wave propagation environment is deteriorated (i.e., the insensitive area) 1*h* overlaps with the route 1*d*. For this reason, when the moving vehicle 1 moves along the route 1*d*, the moving vehicle 1 may not be able to receive the control signal normally in the area 1*h*. In other words, the obstacle 1*g* arranged in the target space as described above is a factor that hinders efficient movement (control) of the moving vehicle 1.

When the area 1*h* is thus an insensitive area, the moving vehicle 1 can be controlled to avoid the insensitive area by, for example, changing the route 1*d* to the route 1*f* (intermediate route) as shown on the right side of FIG. 3.

Incidentally, when the obstacle 1*g* arranged in the target space is removed as the time lapses, in a situation in which a plurality of moving vehicles 1 repeatedly carry loads along the route 1*f* changed from the route 1*d* (i.e., a plurality of moving vehicles 1 repeatedly move around the route between the start point 1*b* and the goal point 1*c*), (the deterioration of) the radio wave propagation environment in the insensitive area 1*h* is improved and the insensitive area 1*h* is eliminated. In this case, it is desirable to recognize the elimination of the insensitive area and change the route in which the moving vehicle 1 moves from the route 1*f* to the route 1*d* again (i.e., to select the route 1*d* again as an appropriate route for the moving vehicle 1).

A method of recognizing the elimination of the insensitive area in the comparative example of the embodiment will be described here.

First, at any timing when the moving vehicle 1 repeatedly transports loads along the route 1*f*, the moving vehicle 1 is controlled to move along the route 1*d*, and a synchronization signal is emitted from the antenna 2*a* (base station 2) when the moving vehicle 1 passes through area 1*h*. The moving vehicle 1 receives the synchronization signal emitted from the antenna 2*a* and thereby measures the received power of the synchronization signal.

In the comparative example of the embodiment, if the received power measured in the area 1*h* as described above is higher than or equal to a threshold value, it can be recognized that the insensitive area is eliminated (i.e., the radio wave propagation environment in the area 1*h* is improved). In contrast, if the received power measured in the area 1*h* is less than the threshold value, it can be recognized that the insensitive area 1*h* is not eliminated.

However, when the moving vehicle 1 is moved to the insensitive area 1*h* in a state in which the insensitive area 1*h* is not eliminated (i.e., the obstacle 1*g* is not removed), the moving vehicle 1 cannot appropriately receive the control signal in the insensitive area 1*h* and may not operate normally (for example, may stop its operation). In this case, much time needs to be spent before the normal operation of the moving vehicle 1 is resumed, and it is not considered that the moving vehicle 1 can be controlled efficiently by properly recognizing the elimination of the insensitive area. Furthermore, moving through the insensitive area may be a factor for the occurrence of accidents, and the like due to the inability to properly receive the control signals (i.e., instructions to change the speed and direction of movement, and the like).

In addition, it is considered that the presence or absence of the obstacle 1*g* can be directly detected without moving the moving vehicle 1 to the above-described area 1*h* by, for example, using the reflection of a laser emitted from the moving vehicle 1.

Figure 4:
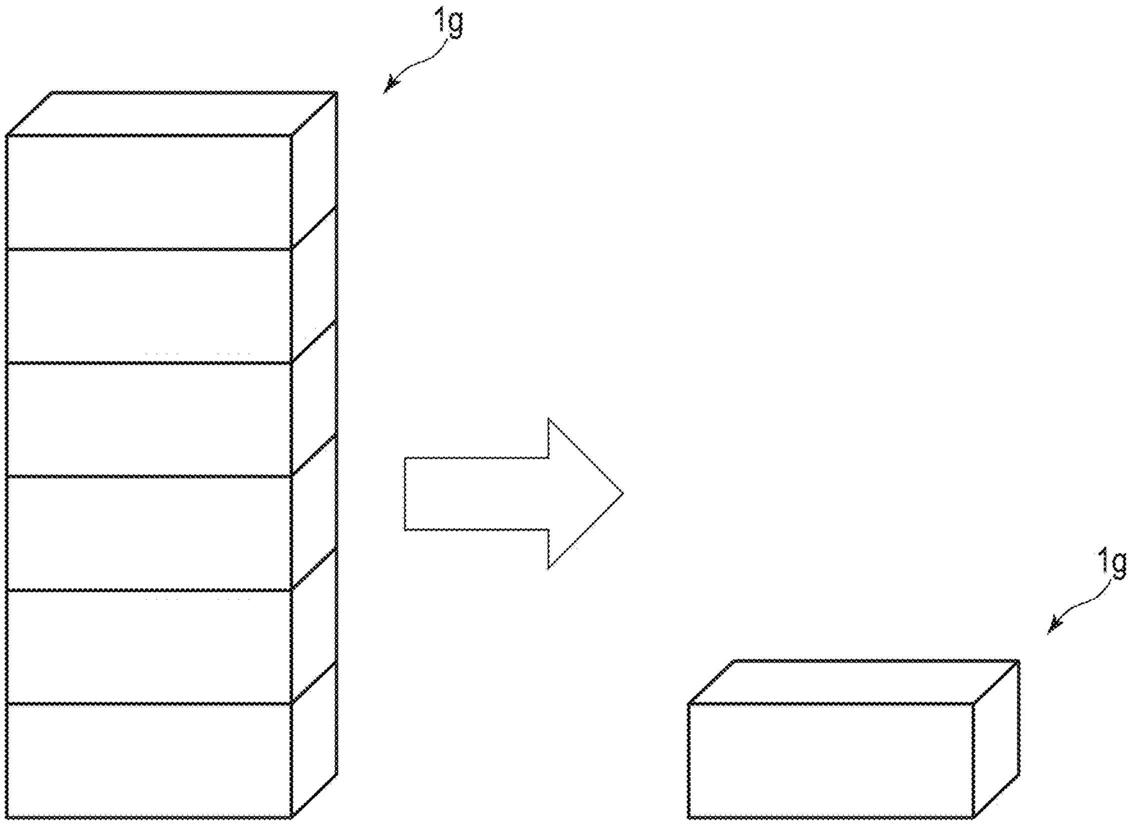
FIG. 4 is a diagram illustrating an obstacle arranged in the target space.

In a situation in which the moving vehicle 1 moves in the target space such as a factory or a warehouse as described above, for example, an obstacle 1*g* formed by stacking (i.e., loading), for example, a plurality of corrugated boxes in which radio wave shields are packed in the height direction may be arranged, and the height of the obstacle 1*g* changes when the corrugated boxes are removed or further stacked. The radio wave propagation environment in the area opposed to the antenna 2*a* across such an obstacle 1*g* is considered to depend on the height of the obstacle 1*g*. More specifically, in the case of the obstacle 1*g* in which, for example, a number of corrugated boxes are stacked in the height direction as shown on the left side of FIG. 4, the insensitive area is generated by the obstacle 1*g*. In a case where the number of the corrugated boxes in the obstacle 1*g* is reduced as shown on the right side of FIG. 4, the influence of the obstacle 1*g* may become small and the insensitive area may be eliminated.

However, as mentioned above, recognizing the height direction of the obstacle 1*g* is difficult according to the directivity of the laser emitted from the moving vehicle 1 as described above, and the elimination of the insensitive area considering the height direction of the obstacle 1*g* cannot be recognized. Applying a mechanism that enables the height direction to be recognized to the moving vehicle 1 is also considered but, when a plurality of moving vehicles 1 are controlled, the costs of building a system are increased.

Furthermore, if the obstacle 1*g*, which is a radio wave shield, is replaced with an obstacle which is not a radio wave shield, the insensitive area may be eliminated even if the obstacle is arranged.

In other words, even if the presence or absence of the obstacle is detected by using the reflection of laser beam emitted from the moving object 1, elimination of the insensitive area may not be able to be properly recognized based on the detection result.

Therefore, in the present embodiment, a moving vehicle control system that can efficiently control the moving vehicle 1 (i.e., recognize the elimination of the insensitive area and select an appropriate route) while avoiding a situation in which the moving vehicle 1 cannot operate normally due to moving in the insensitive area will be described. More specifically, in the present embodiment, the radio wave propagation environment in the target area such as the insensitive area (i.e., the presence or absence of the radio wave shield in the space in which the moving vehicle 1 moves) will be estimated in order to realize the efficient control of the moving vehicle 1.

As shown in FIG. 1, the moving vehicle control system according to the present embodiment includes the moving vehicles 1 (for example, AMR), the base station 2 (antenna 2*a*), and the information processing apparatus 3 (for example, MEC) that is communicatively connected to the moving vehicle 1 via the base station 2.

Figure 5:
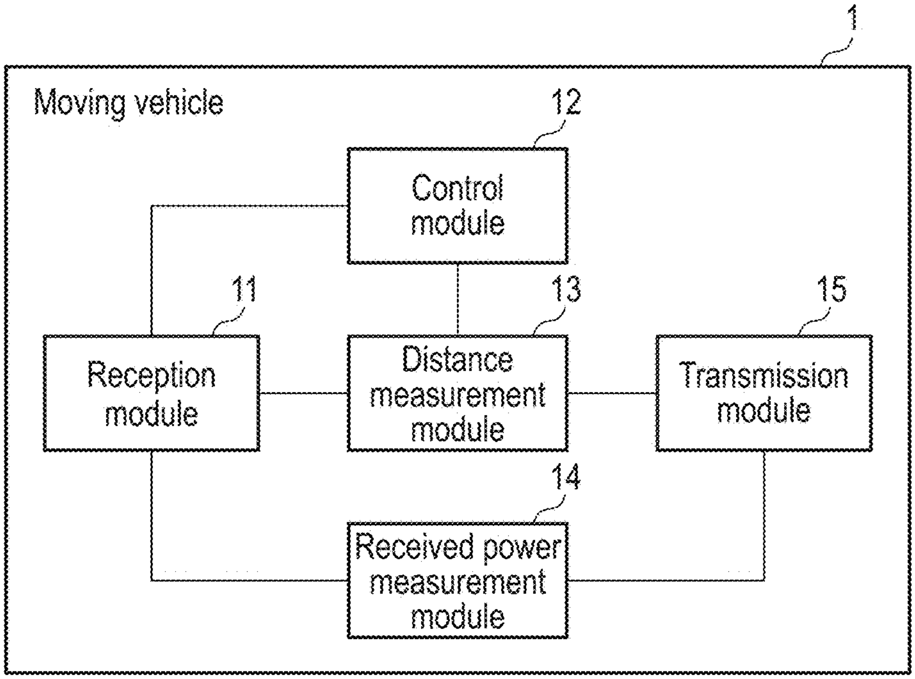
FIG. 5 is a diagram showing an example of a functional configuration of a moving vehicle.

First, an example of a functional configuration of the moving vehicle 1 will be described with reference to FIG. 5. As shown in FIG. 5, the moving vehicle 1 includes a reception module 11, a control module 12, a distance measurement module 13, a received power measurement module 14, and a transmission module 15.

The reception module 11 receives a control signal for controlling the moving vehicle 1. The control signal received by the reception module 11 is output to the control module 12. In addition, the reception module 11 receives a synchronization signal for measuring received power, which will be described later. The synchronization signal received by the reception module 11 is output to the received power measurement module 14. The control signal and the synchronization signal are emitted from the antenna 2*a* installed in the base station 2 to the moving vehicle 1.

The control module 12 controls the moving vehicle 1, based on the control signal output from the reception module 11. The moving vehicle 1 includes wheels or the like for moving the moving vehicle 1, and the control module 12 controls the rotational speed and direction of the wheels (that is, the moving speed and direction of the moving vehicle 1) in accordance with the control signal, thereby causing the moving vehicle 1 to move. The moving speed and direction of the moving vehicle 1 controlled by the control module 12 are output to the distance measurement module 13.

The distance measurement module 13 is implemented by, for example, an optical distance sensor (laser range finder: LRF), and measures the distance from the moving vehicle 1 to a wall or an obstacle existing around the moving vehicle 1, based on the time (time of flight: TOF) taken for a laser (light) emitted from the LRF to be reflected. The (LRF scan data indicative of) distance thus measured by the distance measurement module 13 and (data indicative of) the moving speed and direction of the moving vehicle 1 output from the control module 12 are output to the transmission module 15 as data for generating map data to be described below (hereinafter referred to as data for map generation).

The received power measurement module 14 measures the received power (radio wave strength) of the synchronization signal based on the synchronization signal output from the reception module 11. Received power data indicative of the received power measured by the received power measurement module 14 is transmitted to the transmission module 15.

The transmission module 15 transmits the data for map generation output from the distance measurement module 13 to the information processing apparatus 3. In addition, the transmission module 15 transmits the received power data output from the received power measurement module 14 to the information processing apparatus 3.

Next, an example of a functional configuration of the information processing apparatus 3 will be described with reference to FIG. 6. The information processing apparatus 3 according to the present embodiment is configured to acquire data from the moving vehicle 1 side via the above-described base station 2 and to instruct the route (traveling route) on which the moving vehicle 1 is to travel, to the moving vehicle 1.

Incidentally, the information processing apparatus 3 is assumed to be MEC in the present embodiment, but the information processing apparatus 3 may be realized as a server device or the like located far from the base station 2 via the network or may be realized as a local controller or the like directly connected to the base station 2.

Figure 6:
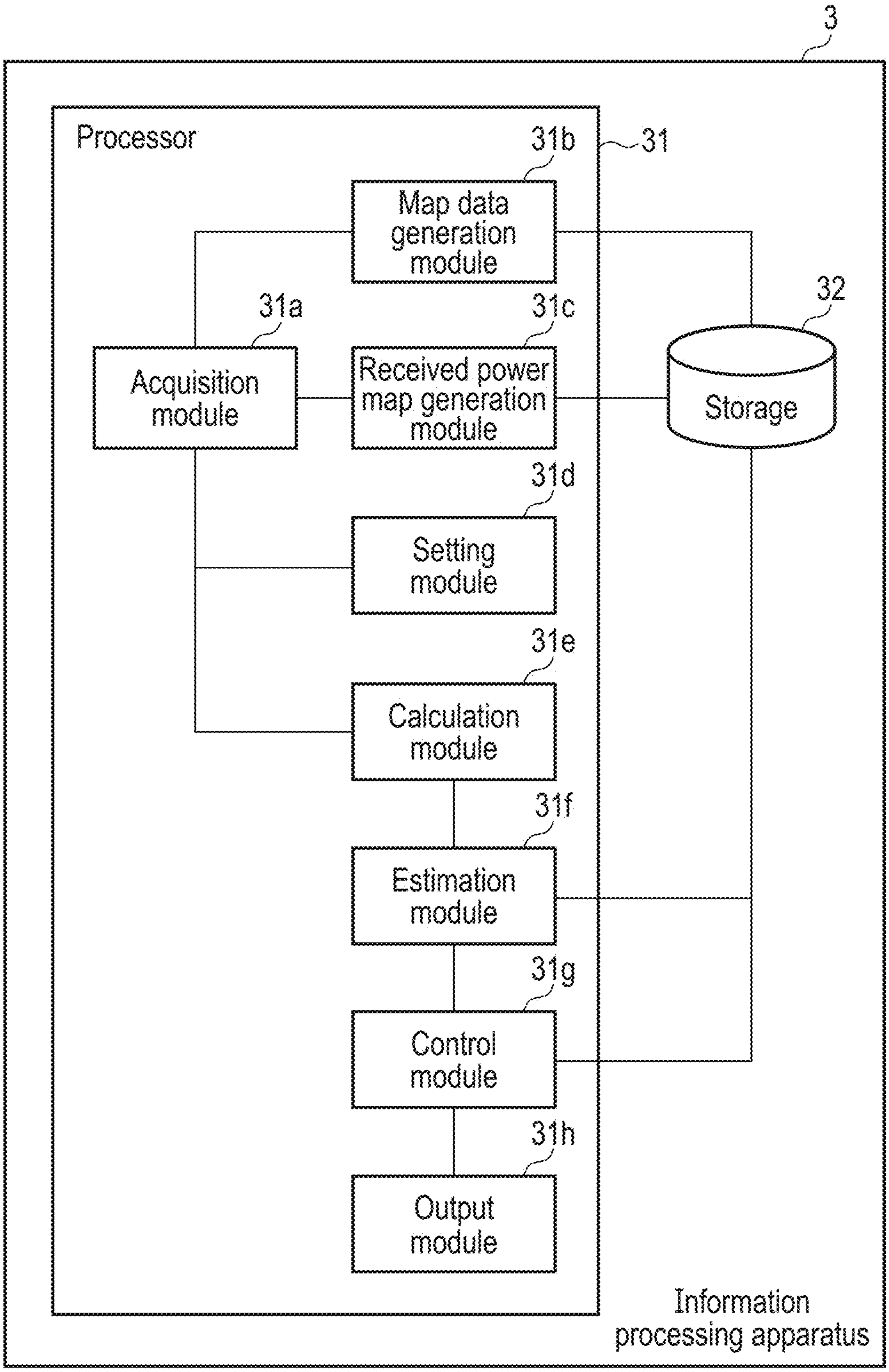
FIG. 6 is a diagram showing an example of a functional configuration of an information processing apparatus.

As shown in FIG. 6, the information processing apparatus 3 includes a processor 31 and a storage 32. In addition, the processor 31 includes an acquisition module 31*a*, a map data generation module 31*b*, a received power map generation module 31*c*, a setting module 31*d*, a calculation module 31*e*, an estimation module 31*f*, a control module 31*g*, and an output module 31*h*.

The data for map generation and the received power data transmitted by the transmission module 15 included in the above-described moving vehicle 1 acquire the data for map generation and the received power data received by the base station 2, from the base station 2. The data for map generation acquired by the acquisition module 31*a* is output to the map data generation module 31*b* and the received power map generation module 31*c*. The received power data acquired by the acquisition module 31*a* is output to the received power map generation module 31*c*.

The map data generation module 31*b* generates map data indicative of a map of the target space, based on the data for map generation, which is output from the acquisition module 31*a*. The map data generated by the map data generation module 31*b* is stored in the storage 32.

The received power map generation module 31*c* generates a received power map of the target space, based on the data for map generation and the received power data, which are output from the acquisition module 31*a*. The received power map generated by the received power map generation module 31*c* is stored in the storage 32. The received power map is data in the form of a heat map in which the received power measured at each position where the moving vehicle 1 moves is allocated to the position (i.e., the positions and the received power are associated with each other).

It is assumed that the information processing module 3 according to the present embodiment calculates coefficients used to estimate the presence or absence of the radio wave shield in the target space (i.e., the space where the moving vehicle 1 moves), and operates to estimate the presence or absence of the radio wave shield using the calculated coefficients.

When calculating the coefficients used to estimate the presence or absence of the radio wave shield in the target space as described above, the acquisition module 31*a* acquires received power data (hereinafter referred to as first received power data) indicative of the received power of the synchronization signal measured on a route (hereinafter referred to as a target route) extending between the antenna 2*a* and the radio wave shield, in a state in which the radio wave shield is arranged in the target space (i.e., a state in which the arrangement of the radio wave shield in the target space is already known). In addition, the acquisition module 31*a* acquires received power data (hereinafter referred to as second received power data) indicative of the received power of the synchronization signal measured on the above-described target route, in a state in which the radio wave shield is not arranged in the target space (i.e., a state in which the arrangement of no radio wave shield in the target space is already known).

When the radio wave shield is arranged at the position of the obstacle 1*g* described with reference to FIG. 3, the above-described target route is, for example, the route 1*f* shown in FIG. 3. In this case, the acquisition module 31*a* acquires as the first received power data the received power data indicative of the received power measured by the moving vehicle 1 moving along the route 1*f* in the state in which the radio wave shield is arranged at the position of the obstacle 1*g*, and acquires as the second received power data the received power measured by the moving vehicle 1 moving along the route 1*f* in the state in which the radio wave shield is not arranged at the position of the obstacle 1*g*.

The setting module 31*d* sets a part of the area on the target route as an area used for processing related to the control of the moving vehicle 1 (hereinafter referred to as a target area), based on an index related to the fluctuation between (the received power indicated by) the first received power data and (the received power indicated by) the second received power data, which are obtained by the acquisition module 31*a*. In the present embodiment, the processing related to the control of the moving vehicle 1 includes the processing for calculating the coefficients used to estimate the presence or absence of the radio wave shield, the processing for estimating the presence or absence of the radio wave shield using the calculated coefficients, and the like.

The calculation module 31*e* calculates the coefficients for estimating the presence or absence of the radio wave shield, based on the received power measured in the target area set by the setting module 31*d* among the received power indicated by the first and second received power data acquired by the acquisition module 31*a*.

When estimating the presence or absence of the radio wave shield in the target space, the acquisition module 31*a* acquires the received power data indicative of the received power of the synchronization signal measured on the above-described target route, in a state in which it is unclear whether or not the radio wave shield is arranged in the target space (i.e., a state in which it is not already known whether or not the radio wave shield is arranged in the target space).

The estimation module 31*f* estimates the presence or absence of the radio wave shield, based on the received power measured in the target area set by the setting module 31*d* among the received power indicated by the received power data acquired by the acquisition module 31*a*, and the coefficient calculated in advance by the calculation module 31*e* as described above.

As described above, in the present embodiment, the timing at which the received power used to calculate the coefficients is measured is different from the timing at which the received power used to estimate the presence or absence of the radio wave shield is measured. As specifically described with reference to FIG. 3, the information processing apparatus 3 (calculation module 31*e* and estimation module 31*f*) according to the present embodiment calculates the coefficients in advance, for example, based on the received power measured on the route 1*f* (target route) and, when the obstacle 1*g* (radio wave shield) is arranged during the operation of the moving vehicle control system and the route 1*d* is thereby changed to the route 1*f*, operates to estimate the presence or absence of the obstacle 1*g* using the received power measured on the route 1*f* and the coefficient. In other words, in the present embodiment, when the route 1*d* (i.e., the shortest route) is changed to the route 1*f* (i.e., the intermediate route) that passes between the base station 2 and the radio wave shield, by arranging the radio wave shield such as the obstacle 1*g*, the apparatus estimates the presence or absence of the radio wave shield (i.e., whether or not the radio wave shield has been removed) without moving through the area opposed to the antenna 2*a* across the radio wave shield (i.e., the area located on the back side of the radio wave shield as viewed from the base station 2).

The control module 31*g* generates control signals to control the moving vehicle 1, based on the map data and received power map stored in the storage module 32 and the estimation results made by the estimation module 31*f*. The control signals generated by the control module 31*g* are output to the output module 31*h*.

The output module 31*h* outputs the control signals output from the control module 31*g* to the base station 2. The control signals thus output from the output module 31*h* are emitted from the antenna 2*a* installed in the base station 2 to the moving vehicle 1.

Figure 7:
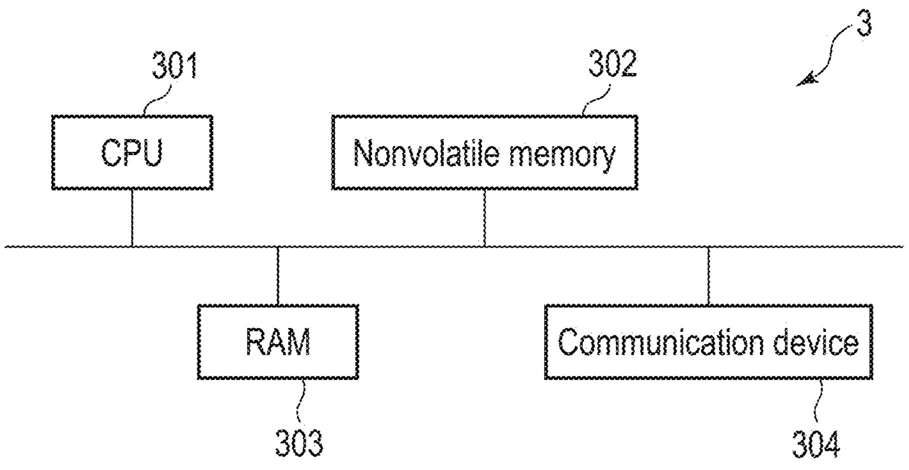
FIG. 7 is a diagram showing an example of a system configuration of the information processing apparatus.

FIG. 7 shows an example of a system configuration of the information processing apparatus 3 shown in FIG. 6. The information processing apparatus 3 includes a CPU 301, a nonvolatile memory 302, a RAM 303, a communication device 304, and the like.

The CPU 301 is a processor for controlling the operations of various components in the information processing apparatus 3. The CPU 301 may be a single processor or may be composed of a plurality of processors. The CPU 301 executes various programs loaded from the nonvolatile memory 302 into the RAM 303. These programs include an operating system (OS) and various application programs.

The nonvolatile memory 302 is a storage medium used as an auxiliary storage device. The RAM 303 is a storage medium used as a main storage device. FIG. 7 shows only the nonvolatile memory 302 and the RAM 303, but the information processing apparatus 3 may include, for example, other storage devices such as a hard disk drive (HDD) and a solid state drive (SSD).

The communication device 304 is a device configured to execute wired communication or wireless communication. The information processing apparatus 3 according to the present embodiment is assumed to be connected to the above-described base station 2 by wire (cable), but may be connected to the base station 2 via a network to execute wireless communication.

Incidentally, in the present embodiment, the processor 31 shown in FIG. 6 is implemented by at least one processor. The processor includes, for example, a control device and an arithmetic device, and is implemented by an analog or digital circuit or the like. The processor may be the above-described CPU 301 or may be a general-purpose processor, a microprocessor, a digital signal processor (DSP), an ASIC, an FPGA, or a combination thereof.

In addition, some or all parts of the processor 31 can be implemented by causing the CPU 301 (i.e., a computer of the information processing apparatus 3) to execute a predetermined program, i.e., by software. The program may be stored in a computer-readable storage medium and distributed, or may be downloaded to the information processing apparatus 3 via a network. Incidentally, some or all parts of the processor 31 may be implemented by dedicated hardware or the like or may be implemented by a combination of software and hardware.

In addition, in the present embodiment, the storage 32 shown in FIG. 6 is implemented by, for example, the nonvolatile memory 302, the other storage device, or the like.

Although detailed explanations are omitted, some or all of the modules 11 to 15 included in the above-described moving vehicle 1 shown in FIG. 5 may be implemented by a processor such as a CPU installed in the moving vehicle 1 executing a predetermined program (i.e., software), by hardware, or by a combination of software and hardware.

In the present embodiment, it is estimated whether or not the radio wave shield is removed without moving to the area opposed to the antenna 2*a* across the radio wave shield (i.e., the presence or absence of the radio wave shield). A method (principle) for implementing the estimation will be described.

Figure 8:
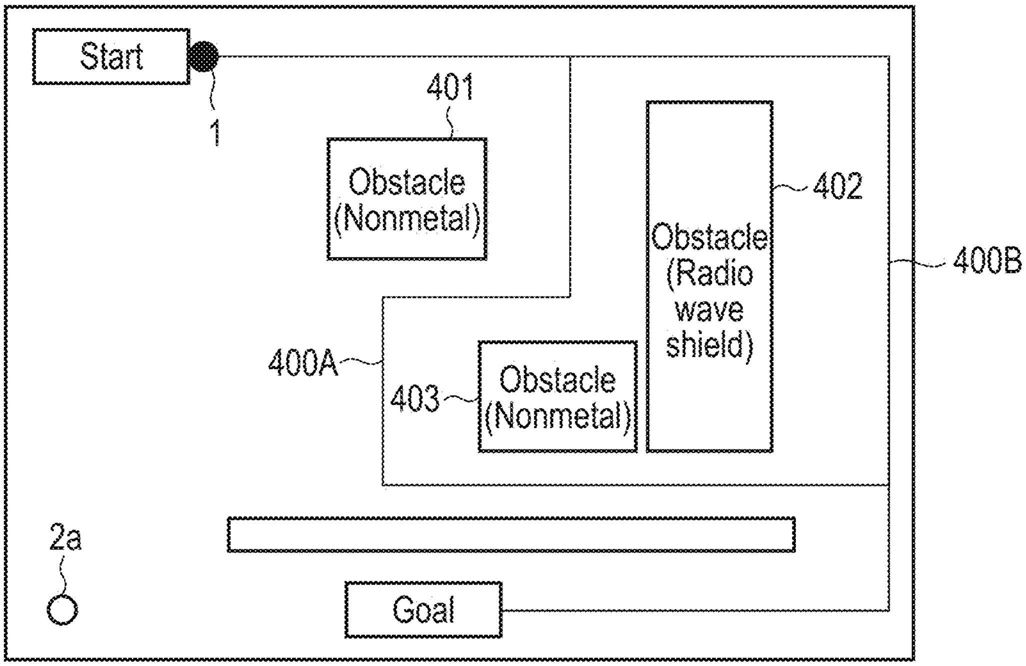
FIG. 8 is a diagram showing another example of the target space.

In the following descriptions, it is assumed that the moving vehicle 1 moves in the target space shown in FIG. 8 for convenience. More specifically, it is assumed that the moving vehicle 1 (AMR) moves through the target space where, for example, obstacles 401 to 403 are arranged as shown in FIG. 8. Incidentally, the obstacles 401 and 403 are obstacles composed of a nonmetal that does not shield a radio wave (i.e., does not affect the radio wave propagation environment). In contrast, the obstacle 402 is an obstacle composed of a radio wave shield such as a metal that shields a radio wave (i.e., affects the radio wave propagation environment).

Routes 400A and 400B are assumed as the routes along which the moving vehicle 1 moves from a start point to a goal point in the target space shown in FIG. 8. In this case, the route 400A is selected as the route for the moving vehicle 1 to move since the route 400B is a route along which the moving vehicle 1 moves through a zone where radio waves are shielded by the obstacle 402 (in other words, an insensitive area). In contrast, if the obstacle 402 is removed, the route 400B needs to be selected since the route 400B is shorter than the route 400A.

In such a scenario, it is assumed that the moving vehicle 1 repeatedly circles (i.e., moves a plurality of times) around the route 400A shown in FIG. 8. Incidentally, the obstacle 402 (radio wave shield) is arranged in FIG. 8, but it is assumed that the presence or absence of the obstacle 402 changes while the moving vehicle 1 repeatedly moves around the route 400A as described above.

It is assumed that the moving vehicle 1 is moving along the route 400A on the X-th lap, and received power Pi at the i-th position on the route 400A is modeled as indicated by Equation (1).

$$P_i = \sum_{j=1}^{k} p_{ij} C_j \quad \text{Equation 1}$$

In Equation (1), i is an index indicative of a position on the route and j is an index indicative of a dominant wave. In this case, for example, j=1 can be defined as a direct wave, j=2 can be defined as a relatively strong reflected wave, j=3 can be defined as a ground-reflected wave, and j=4 can be defined as another multiple wave or the like. Incidentally, the relatively strong reflected wave of j=2 is assumed to be, for example, a reflected wave from the above-described radio wave shield, or the like.

In addition, $p_{ij}$ in Equation (1) is indicative of the power of dominant wave j at position i. $C_j$ indicates whether the dominant wave j (i.e., a j-th wave) is present. For example, when the dominant wave j is present, $C_j=1$. In contrast, when the dominant wave j is not present, $C_j=0$.

Next, to explain the model of Equation (1), the propagation channels between transmission and reception are first considered to be two waves, i.e., a direct wave and a reflected wave. In this case, a total received field strength $E_T$ on the reception side is expressed by a sum of received field strength $E_1$ of the direct wave and received field strength $E_2$ of the reflected wave, as indicated by following Equation (2).

$$E_T = E_1 + E_2 \quad \text{Equation 2}$$

In addition, the total received power $P_T$ on the reception side is expressed as indicated by following Equation (3), using the total received field strength $E_T$ of Equation (2) described above.

$$P_T = |E_T|^2 = |E_1 + E_2|^2 = (E_1 + E_2)(E_1^* + E_2^*) = |E_1|^2 + E_1^* E_2 + E_1 E_2^* + |E_2|^2 \quad \text{Equation 3}$$

Incidentally, the above-described received electric field strengths $E_1$ and $E_2$ are complex numbers, and "*" in Equation (3) is indicative of complex conjugation.

Moreover, the received field strength $E_1$, which is a complex number, is expressed as indicated by Equation (4) when represented by amplitude $A_1$ and phase $\theta_1$.

$$E_1 = A_1 e^{j\theta_1} \quad \text{Equation 4}$$

Similarly, the received field strength $E_2$, which is a complex number, is expressed as indicated by Equation (5) when represented by amplitude $A_2$ and phase $\theta_2$.

$$E_2 = A_2 e^{j\theta} 2 \quad \text{Equation 5}$$

According to Equation (4) described above, $E_1{}^*E_2$ in Equation (3) is transformed as indicated by following Equation (6).

$$E_1^* E_2 = A_1 A_2 e^{j} (\theta_2 - \theta_1) \quad \text{Equation 6}$$

Moreover, according to Equation (5) described above, $E_1E_2{}^*$ in Equation (3) is transformed as indicated by following Equation (7).

$$E_1 E_2^* = A_1 A_2 e^{j(\theta_1 - \theta_2)} \quad \text{Equation 7}$$

Incidentally, in general, the received power acquired by a cellular terminal of 5G, local 5G, or the like is, for example, reference signal received power (RSRP). Since the RSRP is a value averaged at a frequency, the band average of the total received power $P_T$ expressed as Equation (3) described above is expressed as indicated by following Equation (8).

$$\overline{P_T} = \overline{|E_1|^2} + \overline{E_1^* E_2} + \overline{E_1^* E_2} + \overline{|E|^2} \quad \text{Equation 8}$$

When the frequency is a single or narrow band, the phases of both the direct wave and the reflected wave do not vary greatly with respect to the frequency. In this case, the second and third terms on the right side of the Equation (8) are non-zero since the average values of the second and third terms (i.e., $e^{j(\theta 2-\theta 1)}$) and $e^{j(\theta 1-\theta 2)}$) on the right side of the Equation (8) have vectorial values. In contrast, when the frequency is a broadband, the phases are greatly fluctuated with respect to the frequency. In this case, when $e^{j(\theta 2-\theta 1)}$ and $e^{j(\theta 1-\theta 2)}$ are added together, they approach zero vectorially, and the second and third terms on the right side of Equation (8) can be approximated as zero. In other words, Equation (8) described above can be treated as following Equation (9). The average relative to the frequency has been described above, but may be considered as a time average of $e^{j(\theta 2-\theta 1)}$ and $e^{j(\theta 1-\theta 2)}$ or a position average of the order of wavelength of the carrier wave.

$$P_T \approx |E_1|^2 + |E_2|^2 \quad \text{Equation 9}$$

It has been described that the propagation channels between transmission and reception are two waves, but a case in which the propagation channels are three waves will be considered. The three waves include, for example, a direct wave, a reflected wave from the radio wave shield (relatively strong reflected wave), and a ground reflected wave. The total received power on the reception side in this case is expressed as indicated by following Equation (10), similarly to the above-described Equation (3).

Equation 10

$$P_T = |E_T|^2 = |E_1 + E_2 + E_3|^2 = |E_1|^2 + |E_2|^2 + |E_3|^2 + E_1^* + E_2 + E_1 E_2^* + E_1^* E_3 + E_1 E_3^* + E_2^* E_3 + E_2 E_3^*$$

Equation (10) has a larger number of terms than those of Equation (3), but can be considered in the same manner as the case in which the propagation channels are two waves. More specifically, in a case of a broadband, the fourth and subsequent terms (i.e., mutual terms) on the right side of Equation (10) are approximated as zero.

Moreover, in a case where the propagation channels are four or more waves, if the fourth and subsequent waves are scattered waves having a long route length, the fourth and subsequent waves are considered negligible since their strengths are small and have high randomness.

According to the above, it is considered that following Equation (11) obtained by expanding Equation (1) on the assumption that the number of above-described dominant waves j is k, corresponds to Equation (12). The model of Equation (1) is therefore considered to be theoretically explainable.

$$P_T \approx |E_1|^2 + |E_2|^2 + \ldots + |E_k|^2 \quad \text{Equation 11}$$

$$P_i = p_{i1}C_1 + p_{i2}C_2 + \ldots + p_{ik}C_k \quad \text{Equation 12}$$

In the present embodiment, the presence or absence of the radio wave shield arranged in the target space is estimated. In FIG. 8, if the moving vehicle 1 is assumed to move along the route 400A in a state in which the obstacle 402, which is a radio wave shield, is arranged, the moving vehicle 1 receives the reflected wave from the obstacle 402 of the signal (radio wave) transmitted from the antenna 2*a*. In contrast, if the moving vehicle 1 is assumed to move along the route 400A in a state in which the obstacle 402 which is a radio wave shield is not arranged, the moving vehicle 1 does not receive the reflected wave from the obstacle 402 of the signal (radio wave) transmitted from the antenna 2*a*. In other words, the above-described estimation of the presence or absence of the radio wave shield is synonymous with the estimation of the presence or absence of the reflected wave from the radio wave shield.

A method of estimating the presence or absence of the reflected wave from the radio wave shield will be described below using Equation (1). First, following Equation (13), which is a matrix representation of Equation (1), will be considered.

$$\begin{bmatrix} P_1 \\ \vdots \\ P_n \end{bmatrix} = \begin{bmatrix} p_{11} & \cdots & p_{1k} \\ \vdots & \ddots & \vdots \\ p_{n1} & \cdots & p_{nk} \end{bmatrix} \begin{bmatrix} C_1 \\ \vdots \\ C_k \end{bmatrix} \quad \text{Equation 13}$$

In Equation (13), each row represents each element of the positions (i=1, 2, . . . , n) on the route along which the moving vehicle 1 moves, and each column represents each element of the dominant waves (j=1, 2, . . . , k). When both sides of Equation (13) are multiplied from the left by an inverse matrix or a pseudo inverse matrix of a matrix having as a component the power (i.e., $p_{ij}$) per dominant wave at each position on the route along which the moving vehicle 1 moves, Equation (13) is transformed into following Equation (14). Incidentally, the pseudo inverse matrix corresponds to an inverse matrix of a matrix that is not a square matrix.

$$\begin{bmatrix} C_1 \\ \vdots \\ C_k \end{bmatrix} = \begin{bmatrix} p_{11} & \cdots & p_{1k} \\ \vdots & \ddots & \vdots \\ p_{n1} & \cdots & p_{nk} \end{bmatrix}^{-1} \begin{bmatrix} P_1 \\ \vdots \\ P_n \end{bmatrix} \quad \text{Equation 14}$$

Furthermore, the representation of Equation (14) is modified to obtain Equation (15).

$$\begin{bmatrix} C_1 \\ \vdots \\ C_k \end{bmatrix} = \begin{bmatrix} \beta_{11} & \cdots & \beta_{1n} \\ \vdots & \ddots & \vdots \\ \beta_{k1} & \cdots & \beta_{kn} \end{bmatrix} \begin{bmatrix} P_1 \\ \vdots \\ P_n \end{bmatrix} \quad \text{Equation 15}$$

When one row of Equation (15) is extracted and generalized, Equation (16) is obtained.

$$C_j = \beta_{j1}P_1 + \ldots + \beta_{jn}P_n \quad \text{Equation 16}$$

In the present embodiment, the presence or absence of the reflected wave from the radio wave shield should be focused, and the index j indicative of the reflected wave (dominant wave) from the radio wave shield is assumed to be 2. In this case, $C_2$ is defined as y, and $P_i$ is defined as explanatory variable $x_i$. According to this, the above-described Equation (16) is expressed as indicated by Equation (17).

$$y = \beta_1 x_1 + \ldots + \beta_n x_n \quad \text{Equation 17}$$

In the above-described Equation (17), $\beta_1, \ldots, \beta_n$ are regression coefficients, and can be calculated, based on the received power (explanatory variable $x_i$) measured in a state in which the presence or absence of (the reflected wave from) the radio wave shield is already known. Incidentally, in Equation (17), y=1 when (the reflected wave from) the radio wave shield is present, and y=0 when (the reflected wave from) the radio wave shield is absent.

Incidentally, in the above-described Equation (16), even when $C_1$ (direct wave) and $C_3$ (ground reflected wave) are defined as y, the same equation as Equation (17) is obtained. Thus, in the present embodiment, it is important to calculate regression coefficients β ($\beta_1, \ldots, \beta_n$) to be associated with the reflected wave from the radio wave shield.

In a case where the moving vehicle 1 moves around the route 400A shown in FIG. 8 m times (i.e., travels in m laps) and measures the received power (RSRP expressed as a linear value) at each position, and associates the measured received power with (the y value indicative of) the presence or absence of the radio wave shield at the time of the laps, the above Equation (17) is expressed as indicated by following Equation (18).

$$\begin{cases} y_1 = \beta_1 x_{11} + \ \ldots \ + \beta_1 x_{1n} \\ y_2 = \beta_1 x_{21} + \ \ldots \ + \beta_1 x_{2n} \\ \quad \vdots \\ y_m = \beta_1 x_{m1} + \ \ldots \ + \beta_n x_{mn} \end{cases} \quad \text{Equation 18}$$

In addition, when Equation (18) is converted into a matrix, Equation (18) is expressed as indicated by following Equation (19).

$$\begin{bmatrix} y_1 \\ \vdots \\ y_k \end{bmatrix} = \begin{bmatrix} x_{11} & \cdots & x_{1n} \\ \vdots & \ddots & \vdots \\ x_{m1} & \cdots & x_{mn} \end{bmatrix} \begin{bmatrix} \beta_1 \\ \vdots \\ \beta_n \end{bmatrix} \quad \text{Equation 19}$$

Therefore, if Equation (19) is expressed as Y=Xβ, then the received power measured at each position (location) on the route each time the moving vehicle 1 moves around the route is arranged as a component, in X in Equation (19).

More specifically, $x_{11}, \ldots, x_{1n}$ in Equation (19) corresponds to the received power measured by the moving vehicle 1 at locations 1, . . . , n on the route when the number of laps is 1 (i.e., on the first lap). Similarly, $x_{m1}, \ldots, x_{mn}$ in Equation (19) correspond to the received power measured by moving vehicle 1 at positions 1, . . . , n on the route when the number of laps is m (i.e., in the m-th lap).

Figure 9:
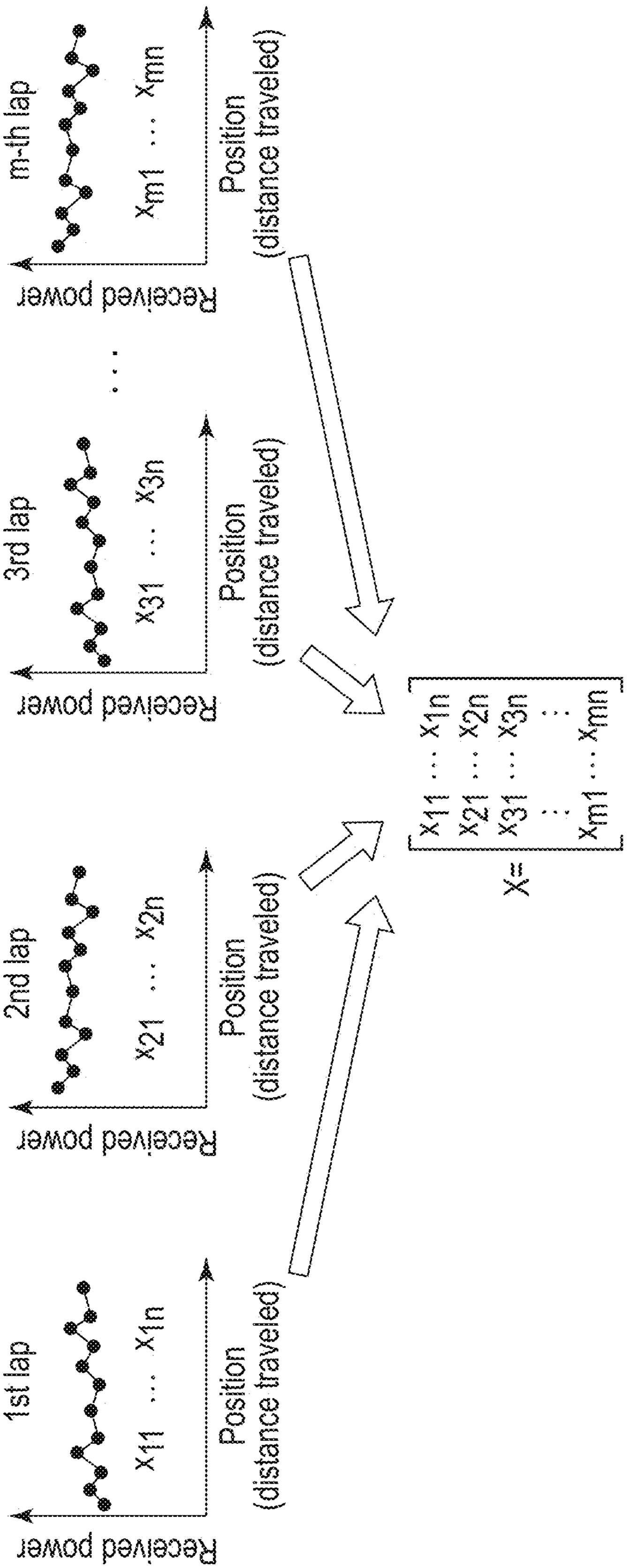
FIG. 9 is a diagram illustrating received power used to calculate regression coefficients.

When the regression coefficient β is calculated (derived) in Equation (19), the received power measured at each of positions 1 to n on the route during the m laps (m time laps) of the moving vehicle 1 on the route is substituted into X, as shown in FIG. 9. Furthermore, the value (y=1 or y=0) indicative of the presence or absence of the radio wave shield, which is already known at the time of the movement along the route, is substituted for Y. The above description is based on the case of a single moving vehicle but, when a plurality of moving vehicles move, the received power for the number of moving vehicles×m laps may be substituted into X.

In this case, the regression coefficients β can be calculated by, for example, multiplying both sides of Equation (19) by a pseudo inverse matrix $X^+$ of the matrix X from the left. In the scenario assumed in the present embodiment, however, the presence or absence of the reflected wave from the radio wave shield should be focused, and the regression coefficients β calculated in this manner are not considered appropriate.

For this reason, in the present embodiment, partial least squares (PLS) regression is applied to calculate the regression coefficients β. In the PLS regression, an eigenvector of $X^TY$ is derived and principal components are extracted in consideration of both X and Y described above. Incidentally, $X^T$ is a transposed matrix of the matrix X. In the PLS regression, to extract principal components having a high correlation with Y, the only specific reflected wave (i.e., the reflected wave from the radio wave shield) needs to be focused, which is considered suitable to the scenario of the present embodiment. In addition, in general, when a strong correlation (multicollinearity) is made between each column of the matrix X, the regression coefficients β become unstable. In the scenario of the present embodiment, since the columns of the matrix X are composed of components corresponding to the respective positions on the route, the spatial correlation between (the received power measured at) the positions may become high, depending on the radio wave propagation environment. In the PLS regression, however, since the orthogonal components, i.e., components having a low correlation are extracted, it is possible to prevent the regression coefficients β becoming unstable due to the influence of multicollinearity.

A specific calculation method of the regression coefficients in the PLS regression will be described. First, matrices E and F are defined, and X and T are substituted for their initial values.

Next, $E^TF=U_{svd}\Sigma V_{svd}$ is obtained by singular value decomposition, and the first columns of $U_{svd}$ and $V_{svd}$ are defined as a column vector w and a column vector c, respectively. Incidentally, "T" is indicative of the transposed matrix.

Moreover, w and c are normalized such that $w^Tw=1$ and $c^Tc=1$, and t and u are obtained from t=Ew and u=Fc. In addition, t and u are normalized such that $t^Tt=1$ and $u^Tu=1$, and p and q are obtained from $p=E^Tt$ and $q=F^Tt$. The extraction of the first component is thereby completed.

Then, E and F are updated by subtracting $tp^T$ and $tq^T$ from E and F, respectively, and the processing is repeated to extract second and subsequent components.

For example, if L components are assumed to be extracted by repeating the process as described above, the matrices W, P, and Q are defined as indicated by following Equation (20).

$$W = [\, w_1 \;\ldots\; w_L L \,]$$
$$P = [\, p_1 \;\ldots\; p_L \,]$$
$$Q = [\, q_1 \;\ldots\; q_L \,]$$
Equation 20

The regression coefficient β in the above Equation (19) is calculated by the following Equation (21) using the matrices W, P and Q defined in this manner.

$$\beta = W(P^T W)^{-1} \cdot Q^T$$
Equation 21

Incidentally, in the present embodiment, the radio wave propagation environment of a factory or a warehouse in which the moving vehicle 1 moves is complicated. It is assumed that a first principal component is a direct wave and a second principal component is a reflected wave, although precise classification is difficult. It is considered that the contribution degrees of third and subsequent principal components are lower than those of the first and second principal components and include noise components. Based on this, the number of components extracted by the PLS regression is determined.

In the present embodiment, as described above, the regression coefficients can be calculated using the received power measured at each position on the route in a state in which the presence or absence of the radio wave shield is already known (i.e., a state in which the radio wave shield is arranged and a state in which the radio wave shield is not arranged). Incidentally, in the present embodiment, calculating (deriving) the regression coefficients in this manner is referred to as learning.

In the present embodiment, to estimate the presence or absence of the radio wave shield (radio wave propagation environment) at the time of the operation of the moving vehicle control system, the regression coefficients ($\beta_1, \ldots, \beta_n$) calculated through the learning are multiplied by received power ($x_1, \ldots, x_n$) newly measured on the same route, as indicated by following Equation (22).

$$y = \beta_1 x_1 + \ldots + \beta_n x_n$$
Equation 22

The value of y calculated by Equation (22) described above corresponds to a value indicative of the presence or absence of the radio wave shield, and the presence or absence of the radio wave shield can be estimated (analogized) by executing the threshold judgment for the value of y.

By the way, in the present embodiment, the presence or absence of the radio wave shield is estimated by focusing on the fluctuation in the received power (RSRP) caused by the reflected waves from the radio wave shield, but the received power may also vary due to other factors. If the presence or absence of the radio wave shield is estimated using the regression coefficients calculated based on the received power with such variations caused by the other factors (i.e., variations other than desired variation), the accuracy of the estimation is expected to be deteriorated. For this reason, in the present embodiment, differences between the fluctuations in the received power caused by the reflected waves from the radio wave shields and the variations in the received power caused by the other factors need to be recognized.

For example, when the received power is measured by a plurality of moving vehicles 1 (AMR), the above-described variations caused by the other factors may occur due to individual differences in the radio devices (receivers) mounted on the moving vehicles 1, differences in position of the radio devices (receiving antennas) mounted on the moving vehicles 1 in the order of wavelength, disturbance of the propagation environment which results from the traveling interval of the plurality of moving vehicles 1, and the like.

In addition, even when the plurality of moving vehicles 1 are controlled to move along the same route, the plurality of moving vehicles 1 can hardly travel at completely the same position, and the order of wavelengths is deviated at the position at which each of the plurality of moving vehicles 1 measures the received power. Such a displacement in the position at which the received power is measured is one of the factors that causes the above-mentioned variation in received power.

Furthermore, since the data for map generation is output from the distance measurement module 13 which is realized by LRF and the received power data is output from the received power measurement module 14 which is realized by the radio device, for each of the plurality of moving vehicles 1, the position at which the fluctuation of the received power caused by the reflected waves from the radio wave shield is recognized at the information processing apparatus 1 (i.e., the timing at which the received power increases), and the like may differ in each lap of the moving vehicle 1. In addition, the received power measured at each position along the route is used when the regression coefficients are calculated and when the presence or absence of the radio wave shield is estimated in the present embodiment. However, the lag which occurs in the association between the position and the received power may be a factor of the variation in received power.

Incidentally, in the present embodiment, it is assumed that a relatively inexpensive radio device (such as a portable terminal) is mounted on the moving vehicle 1 to measure the received power in consideration of the cost of constructing the system. In such a case, the amplitude and phase components of each frequency cannot be obtained, and only the averaged amplitude component (received power) may be able to be obtained in many cases.

Therefore, in the present embodiment, in order to suppress the degradation in estimation accuracy of the presence or absence of the radio wave shield, which is caused by the above-described variation in received power, a target area is set based on an index on the fluctuation of the received power according to the presence or absence of the radio wave shield, and the processing for the control of the moving vehicle 1 is executed using the received power measured in the target area.

The operations of the information processing apparatus 3 according to the present embodiment will be described below. A process of the information processing apparatus 3 for calculating the above-described regression coefficients (hereinafter referred to as a learning process) and a process of the information processing apparatus 3 for estimating the presence or absence of the radio wave shield (hereinafter referred to as an estimation process) will be described here.

First, an example of a procedure of the above-described learning process will be described with reference to a flowchart of FIG. 10.

In the learning process, processing of generating the map data and the received power map is executed as preprocessing (preparation) for calculating the regression coefficients (step S1).

First, the processing of generating the map data will be described. When the target space (environment) is a space which is static to a certain degree, it is sufficient that fixed map data indicative of a map of the target space is prepared in advance. However, since the arrangement of obstacles (loads such as corrugated boxes) changes with time, in the above-described target space such as a factory or a warehouse, the map data needs to be generated (updated) dynamically.

In this case, the processor 31 (control module 31*g*) included in the information processing apparatus 3 generates control signals to control the the moving vehicle 1 to move throughout the entire range within which the moving vehicle 1 in the target space can move. The control signal (downlink) thus generated in the processor 31 is output from the processor 31 (output module 31*h*) to the base station 2 and is transmitted from the base station 2 to the moving vehicle 1. In this case, the control signal is received by the reception module 11 included in the moving vehicle 1, and the control module 12 controls the moving speed and direction of the moving vehicle 1, based on the control signal. The moving vehicle 1 thereby moves through the entire target space.

The distance measurement module 13 included in the moving vehicle 1 measures TOF by LRF or the like, and thereby measures the distance to an object (for example, a wall, an obstacle, or the like) existing around the moving vehicle 1 moving in the target space.

The transmission module 15 transmits the data for map generation (uplink) including the distance thus measured by the distance measurement module 13 and the moving speed and direction of the moving vehicle 1 controlled by the control module 12 to the information processing apparatus 3 via the base station 2. Incidentally, for example, the data for map generation is transmitted to the information processing apparatus 3 every time the moving vehicle 1 moves based on the control signal (i.e., for each position in the target space).

As described above, the data for map generation transmitted from the moving vehicle 1 (transmission module 15) is received by the base station 2 and is output to the information processing apparatus 3. The processor 31 (acquisition module 31*a*) included in the information processing apparatus 3 acquires the data for map generation output from the base station 2. The processor 31 (map data generation module 31*b*) generates map data indicative of the map of the target space, based on the distance and the moving speed and direction of the moving vehicle 1, which are included in the acquired data for map generation. The map data thus generated by the processor 31 is data indicative of a map such as a plan view showing a wall forming the target space, a passage along which the moving vehicle 1 can move, an obstacle arranged in the target space, and the like.

Incidentally, the map data may be generated by, for example, updating the initial layout of the target space in which an obstacle and the like are not arranged (i.e., the map data indicative of only the wall and the passage).

The map data generated by the processor 31 (map data generation module 31*b*) as described above is stored in the storage 32.

Next, the processing of generating the received power map will be described. In this case, the processor 31 (control module 31*g*) included in information processing apparatus 3 generates the control signals to control the moving vehicle 1 to move through all the passages on the map indicated by the map data stored in the storage 32 as described above. The control signal thus generated in the processor 31 is output from the processor 31 (output module 31*h*) to the base station 2 and is transmitted from the base station 2 to the moving vehicle 1. The moving vehicle 1 thereby moves through the entire target space.

In 5G (local 5G), a synchronization signal is broadcast from the base station 2. The reception module 11 included in the moving vehicle 1 receives the synchronization signal thus broadcast from the base station 2.

The received power measurement module 14 measures the received power of the synchronization signal received by the reception module 11. Incidentally, for example, RSRP is used as the received power to be measured in the present embodiment. The received power may be, for example, Received Signal Strength Indicator (RSSI), Secondary Synchronization Signal-Reference Signal Received Power (SSS-RSRP), Primary Synchronization Signal-Reference Signal Received Power (PSS-RSRP) or the like.

In addition, it has been described that the received power of the synchronization signal broadcast from the base station 2 is measured but, in 5G (local 5G), for example, a plurality of reference signals such as Channel State Information Reference Signal (CSI-RS), which is a reference signal for estimating channel information, and Demodulation Reference Signal (DM-RS), which is a reference signal for demodulation, are prepared. For this reason, the received power may be measured using these reference signals. In this case, the received power of one reference signal among the plurality of reference signals differing in at least one of frequency, time, and antenna may be measured or an average value of the received power of each of the plurality of reference signals may be measured.

The transmission module 15 transmits received power data indicative of the received power thus measured by the received power measurement module 14 to the information processing apparatus 3 via the base station 2. Incidentally, for example, the received power data is transmitted to the information processing apparatus 3 every time the moving vehicle 1 moves based on the control signal (for each point in the target space).

Furthermore, although detailed description is omitted, the above-described data for map generation (the distance to an object existing around the moving vehicle 1 and the moving speed and direction of the moving vehicle 1) are transmitted from the moving vehicle 1 to the information processing apparatus 3 every time the moving vehicle 1 moves, in the processing of generating the received power map, too.

The data for map generation and the received power data transmitted from the moving vehicle 1 (transmission module 15) is received by the base station 2 and is output to the information processing apparatus 3 as described above. The processor 31 (acquisition module 31*a*) included in the information processing apparatus 3 acquires the data for map generation and the received power data, which are output from the base station 2.

The processor 31 can acquire (recognize) the position of the moving vehicle 1 on the map indicated by the map data, based on the distance to the object existing around the moving vehicle 1 and the moving speed and direction of the moving vehicle 1 included in the data for map generation. The processor 31 (received power map generation module 31*c*) generates a received power map (i.e., a heat map of the received power at each position of the moving vehicle 1) obtained by mapping the position of the moving vehicle 1 thus acquired and the received power indicated by the received power data. More specifically, the processor 31 generates the received power map by allocating the received power measured at each position by the movement of the moving vehicle 1 to (pixels corresponding to) the positions (i.e., by associating the positions with the received power). The received power map thus generated corresponds to a radio wave map indicative of the radio wave propagation environment in the target space. Incidentally, when a human intervenes in the control on the information processing apparatus 3 (MEC) side, the received power map in a visually recognizable form may be generated.

The received power map generated by the processor 31 (received power map generation module 31*c*) as described above is stored in the storage 32.

Incidentally, the data for map generation is used to obtain the position to which the received power indicated by the received power data is allocated, In the process of generating the received power map. The data for map generation is also used to update the above-described map data (i.e., arrangement of the obstacle, and the like) stored in the storage 32.

In addition, it has been described that the received power map is generated based on the received power of a downlink signal (synchronization signal). However, since duality (symmetrical relationship) is generally made between the downlink and the uplink in wireless communication, the received power map may be generated based on the received power of an uplink signal or may be generated based on the result of the merging of the received power of a downlink signal and the received power of an uplink signal.

Incidentally, in the present embodiment, the processing of generating the map data and the processing of generating the received power map have been described separately (i.e., it has been described that the map data is generated and then the received power map is generated). However, the map data and the received power map may be generated at the same time (in parallel).

In addition, in the present embodiment, a map in which a throughput or bit error rate of a signal is allocated to each position on the map may be generated instead of the received power map, as long as the radio wave (signal) propagation environment in the target space can be recognized.

Furthermore, for example, when an obstacle (for example, a radio wave shield) arranged in the target space is already known, information such as the position of the obstacle recognized by premeasurement or the like may be registered (held) in the map data and the received power map.

After the process of step S1 is executed, the processor 31 (control module 31*g*) included in the information processing apparatus 3 selects a route in the target space around which the plurality of moving vehicles 1 move (i.e., measure the received power) to calculate the regression coefficients (step S2). Incidentally, the route selected in step S2 is a route including a position that is in the line of sight from the antenna 2*a* even when the radio wave shield is arranged (i.e., a route which passes between the antenna 2*a* and the radio wave shield). In the present embodiment, the regression coefficients used to estimate the presence or absence of the radio wave shield are calculated using the received power measured by the plurality of moving vehicles 1 moving around such a passage.

Incidentally, in step S2, for example, a route based on the position where the radio wave shield is arranged or the position where the radio wave shield may be arranged may be automatically selected by referring to the map data and the received power map stored in the storage 32 or a route specified by the administrator of the moving vehicle control system may be selected.

Figure 11:
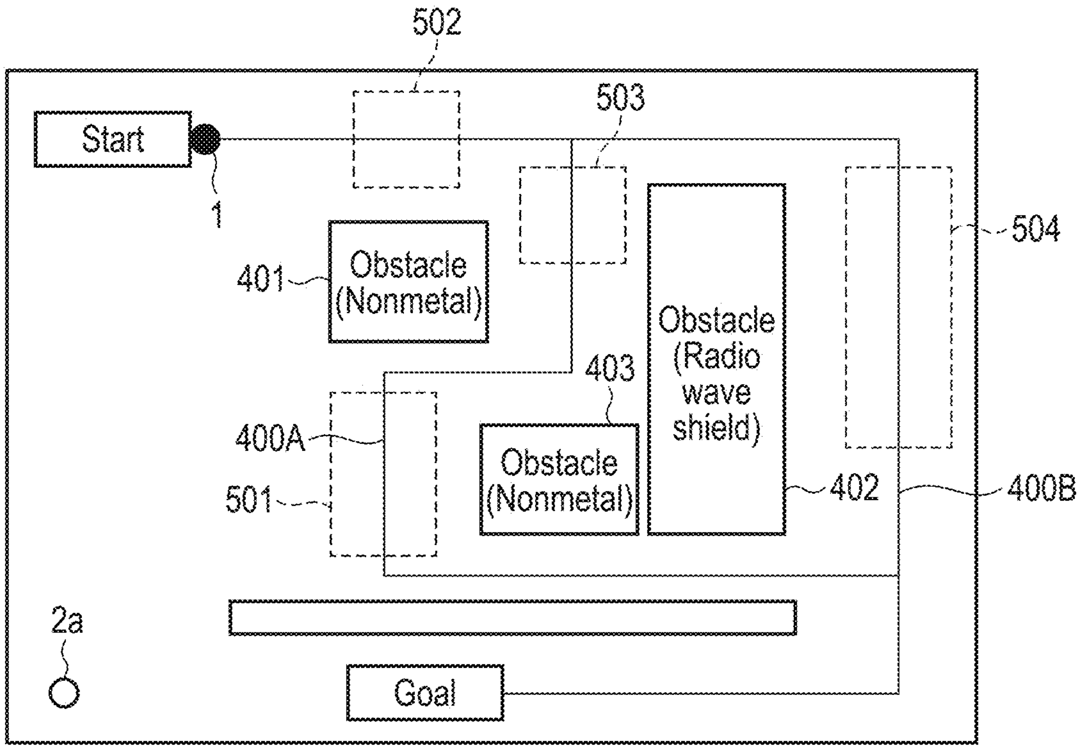
FIG. 11 is a diagram illustrating a route around which a plurality of moving vehicles move.

More specifically, as shown in, for example, FIG. 11, the area 501 in the target space corresponds to a position within the line of sight from the antenna 2*a*. In addition, areas 502 and 503 in the target space correspond to positions that are in the line of sight from the antenna 2*a* from the viewpoint of the radio wave when an obstacle 401 is arranged between the antenna 2*a* and the areas (i.e., arranged behind the obstacle 401) but the obstacle 401 is not a radio wave shield (non-metal). In this case, in step S2, for example, a route 400A including a position that is in the line of sight from the antenna 2*a* to the obstacle 402 that is a radio wave shield is selected. Incidentally, when the obstacle 402 which is a radio wave shield is located, the area 504 in the target space is out of the line of sight from the antenna 2*a* and the route 400B is not selected.

After the process of step S2 is executed, the processor 31 (control module 31*g*) controls the moving vehicle 1 to move along the route selected in the step S2 (step S3). A control signal for controlling the moving vehicle 1, which is generated by the processor 31, is output to the base station 2, and the control of the moving vehicle 1 in step S3 is realized by transmitting the control signal from the base station 2 to the moving vehicle 1.

When the above-described processing of step S3 is executed, the moving vehicle 1 moves along the route selected in step S2, and the moving vehicle 1 transmits the received power data indicative of the received power measured at each position during the movement to the information processing apparatus 3 via the base station 2.

In this case, the processor 31 (acquisition module 31*a*) included in the information processing apparatus 3 acquires the received power data transmitted from the moving vehicle 1 that has moved along the route selected in step S2 (i.e., the received power measured by the moving vehicle 1) from the base station 2 (step S4). The received power data acquired in step S4 is held in the processor 31 (setting module 31*d*). The received power data has been described, but the processor 31 also receives the data for map generation together with the received power data.

Next, it is determined whether or not the movement of the moving vehicle 1 (i.e., the measurement of the received power) is to be ended (step S5).

In the present embodiment, as described above, the regression coefficients are calculated using the received power measured by making the plurality of moving vehicles 1 move along the same route (travel in plural laps) in a state in which the arrangement of the radio wave shield in the target space is already known as described above, and the received power measured by making the plurality of moving vehicles 1 move along the same route in a state in which no arrangement of the plurality of moving vehicles 1 in the target space is already known.

Figure 12:
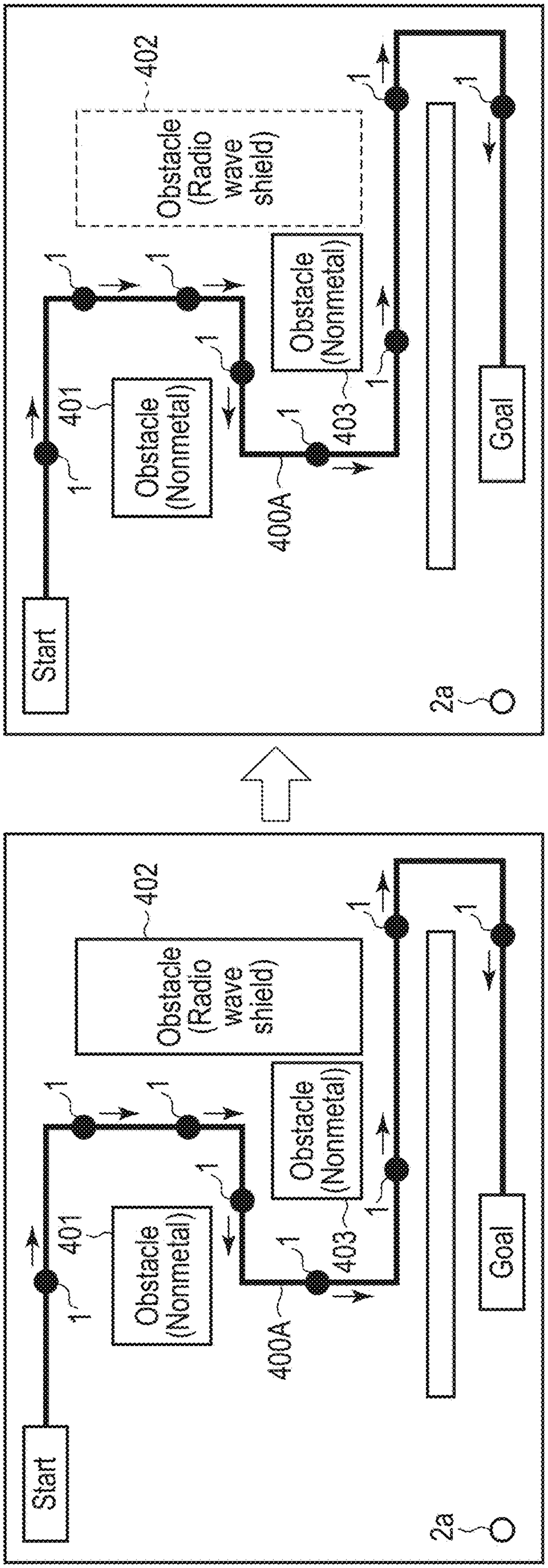
FIG. 12 is a diagram illustrating the received power used in the learning process.

For this reason, as shown in FIG. 12, for example, after the plurality of moving vehicles 1 are made to move along the route 400A with the obstacle 402, which is a radio wave shield, arranged, until the laps reach the predetermined number of times, the plurality of moving vehicles 1 are made to move along the route 400A until the laps reach the predetermined number of times in a state in which the obstacle 402, which is a radio wave shield, is not arranged (i.e., removed). Therefore, (the received power data indicative of) the received power measured at each position on the route 400A is collected.

Figure 13:
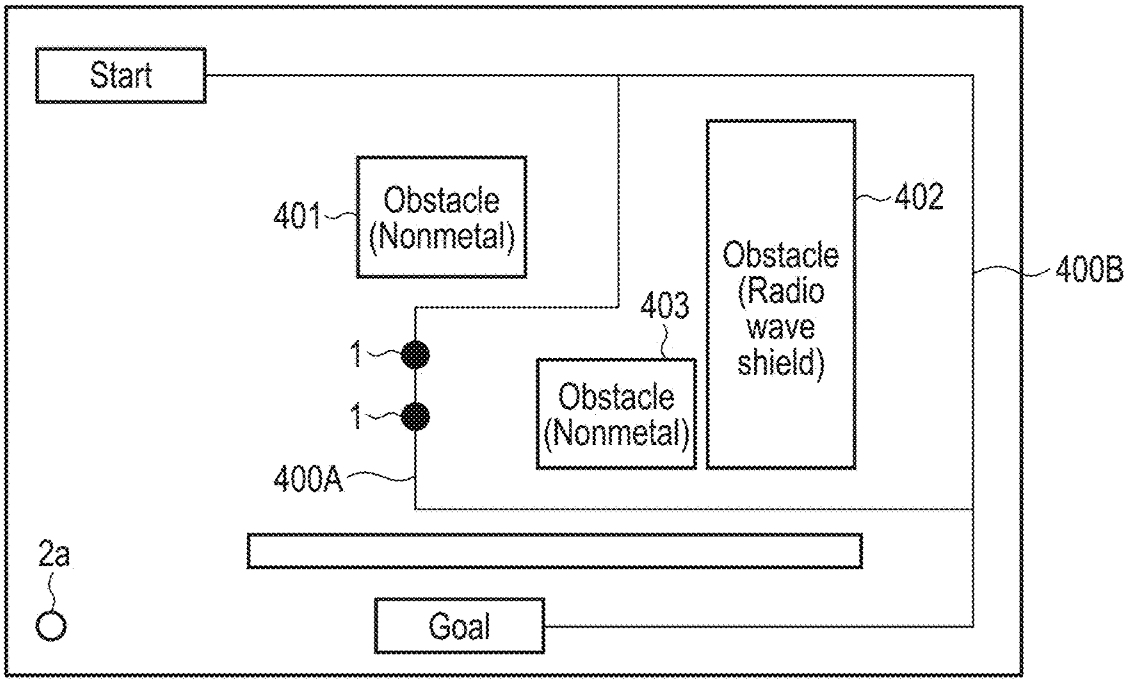
FIG. 13 is a diagram illustrating a distance between a plurality of moving vehicles moving around the route.
Figure 14:
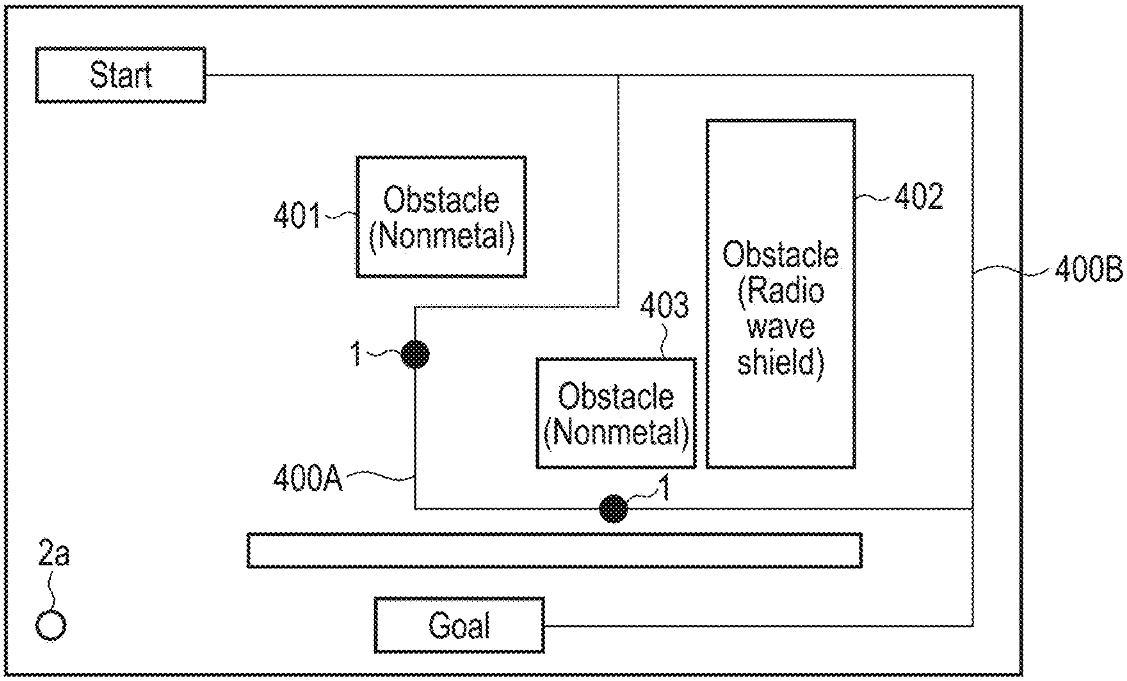
FIG. 14 is a diagram illustrating a distance between a plurality of moving vehicles moving around the route.

Incidentally, in the present embodiment, a plurality of moving vehicles 1 repeatedly move along the route. The degree of density of the plurality of moving vehicles 1 and the distance between the plurality of moving vehicles 1 may affect (fluctuation of) the received power measured at the moving vehicles 1. More specifically, for example, as shown in FIG. 13, when the distance between two moving vehicles 1 is short (i.e., their density is high), the received power measured by one of the moving vehicles 1 may be affected by the reflected waves from the other moving vehicle 1. For this reason, the plurality of moving vehicles 1 may be controlled under conditions that the distance between the two moving vehicles 1 is higher than or equal to the threshold value (or the density is below the threshold value) as shown in, for example, FIG. 14.

Furthermore, (the strength of) the received power may be measured in a state in which each of the plurality of moving vehicles 1 is stopped to improve the stability. For this reason, the plurality of moving vehicles 1 may be controlled under conditions that the moving vehicles are repeatedly moved and stopped during the movement along the route and the received power is measured at the timing of stop.

Incidentally, in the present embodiment, the received power is measured in each of the state in which the radio wave shield is arranged in the target space and the state in which the radio wave shield is not arranged in the target space, but the plurality of moving vehicles 1 in each state desirably measure the received power under as much the same conditions as possible.

Figures 15, 16:
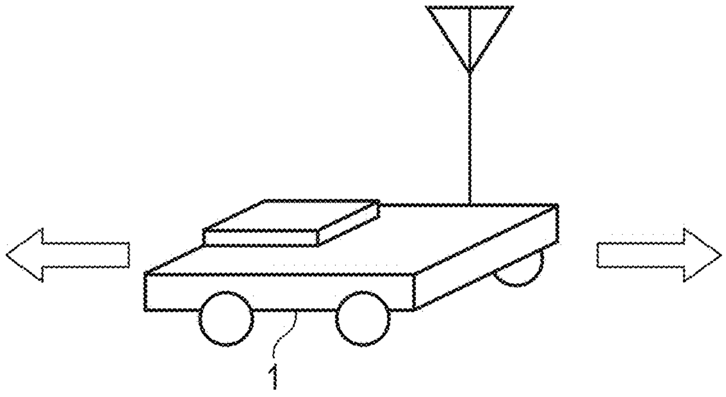
FIG. 15 is a diagram illustrating a traveling direction of the moving vehicle.
FIG. 16 is a table showing an example of a data structure of received power data.

For example, when the moving vehicle 1 is configured to travel in a plurality of directions as shown in FIG. 15, the conditions for the plurality of moving vehicles 1 to measure the received power may include the condition that the direction in which the moving vehicles 1 travel (i.e., the orientation of traveling) is the same. Furthermore, the conditions for the plurality of moving vehicles 1 to measure the received power may include the condition that the position of the radio device mounted on the moving vehicles 1 (i.e., the installation position, height, and the like of the antenna) mounted on the moving vehicle 1.

However, since the plurality of moving vehicles 1 can hardly travel along completely the same route (position) in each lap, the position of each of the plurality of moving vehicles 1 for measuring the received power in each lap may be displaced in, for example, the order of wavelengths. Incidentally, in the present embodiment, it is considered that the routes (positions) may be shifted in the order of wavelengths when the moving vehicle 1 is made to travel along the same route, and the information on the number of laps is also obtained in order to recognize the tendency of such shift by laps.

In step S5, when all the received power for calculating the regression coefficients is collected (acquired) as described above, it is determined that the movement of the moving vehicle 1 is ended. In contrast, in step S5, when all the received power for calculating the regression coefficients is not collected (acquired) as described above, it is determined that the movement of the moving vehicle 1 is not ended.

If it is determined that the movement of the moving vehicle 1 is not ended (NO in step S5), the flow returns to step S3 and the processing is repeated.

In contrast, if it is determined that the movement of the moving vehicle 1 is ended (YES in step S5), the processor 31 (setting module 31*d*) sets the target area used for the processing related to the control of the moving vehicle 1 by using the received power data acquired in step S4 (i.e., the received power data held in the processor 31) (step S6).

The process of step S6 will be described below in detail. First, FIG. 16 shows an example of the data structure of the received power data held in the processor 31.

As shown in FIG. 16, the received power data held in the processor 31 includes, for example, identification information for identifying the moving vehicle 1 (hereinafter referred to as a moving vehicle ID), the number of laps of the route for the moving vehicle 1 to measure the received power (i.e., the number of times at which the moving vehicle moves along the route), the received power measured by the moving vehicle 1, the time when the received power is measured, and the position of the moving vehicle 1 at the time when the received power is measured, in association with one another. The moving vehicle ID included in the received power data is, for example, an identification number, but may be other information. In addition, the moving vehicle ID, the number of laps, the received power, and the time included in the received power data are information obtained from the moving vehicle 1. The position included in the received power data is obtained, for example, based on the data for map generation transmitted from the moving vehicle 1 as described above.

Incidentally, FIG. 16 shows only part of the received power data held in the processor 31, but all the received power data acquired by repeating the above-described steps S3 and S4 are held in the processor 31.

In addition, it has been described that the received power data shown in FIG. 16 is held in the processor 31, but the received power data may be stored in, for example, the storage 32 or a storage other than the storage 32.

Furthermore, the received power data may have a data structure other than that described with reference to FIG. 16 and may be held (maintained) in the form of, for example, a received power map in which the received power and the like are assigned to positions. Incidentally, when the received power data acquired in the learning process is stored in the form of the received power map, the received power map may be used for stable route control of the moving vehicle 1 during the operation of the moving vehicle control system.

As described above, the received power data held in the processor 31 includes the received power measured while the plurality of moving vehicles 1 repeatedly move along the route, and the received power is considered to have fluctuations caused by the reflected waves from the radio wave shields and the variations caused by the other factors as described above.

If it is assumed that variations in the received power are caused by the misalignment of the positions at which each of the plurality of moving vehicles 1 measures the received power in each lap, the processor 31 sets a reference position on the route and extracts the received power measured in the vicinity of the reference position from (the received power indicated by) the received power data held in the processor 31, in order to absorb such variations.

Figure 17:
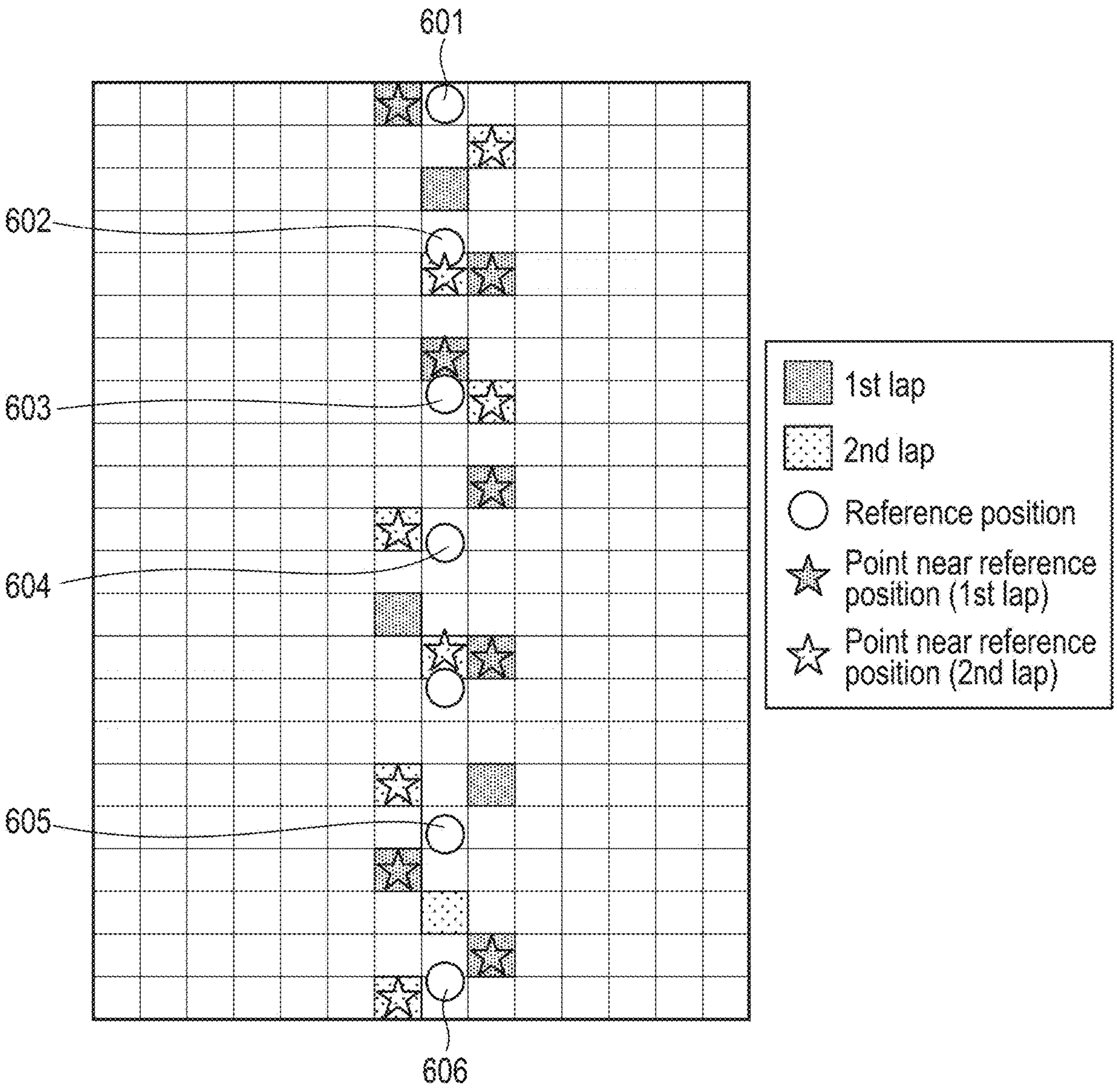
FIG. 17 is a diagram illustrating reference positions.

The above-described reference position will be described below with reference to FIG. 17. FIG. 17 shows a plurality of reference positions set on the route around which the moving vehicle 1 moves and a plurality of positions where the received power is measured when the moving vehicle 1 moves along the route. In FIG. 17, it is assumed that the moving vehicle 1 moves along the route twice.

In the present embodiment, as shown in FIG. 17, for example, the received power measured in the vicinity of each of the plurality of reference positions (for example, positions within a predetermined range set based on the reference positions or positions where the distance from the reference positions is less than or equal to a predetermined value) is extracted. More specifically, the received power measured in the vicinity of the reference position is the received power measured at the position with the shortest distance from the reference position, among the positions where the received power is measured in the vicinity of the reference positions.

In the example shown in FIG. 17, reference positions 601 to 606 are set on the route. In this case, the received power measured at the neighboring points of each of the reference positions 601 to 606, among the received power measured in the first lap of the route, is extracted. Similarly, the received power measured at the neighboring points of each of the reference positions 601 to 606, among the received power measured in the second lap of the route, is extracted. Incidentally, in FIG. 17, the positions where the extracted received power is measured for each lap are marked with an asterisk.

In FIG. 17, the received power measured by one moving vehicle 1 has been described, but the received power measured in the vicinity of each of the plurality of reference positions is also extracted for other moving vehicles 1 in the same manner.

As shown in FIG. 17, even if the moving vehicle 1 repeatedly moves along the same route, the positions where the moving vehicle 1 moves (travels) and the positions where the received power is measured at each lap are displaced. The influence of the received power variations caused by the displacement of the positions can be reduced by setting the plurality of reference positions in advance.

Incidentally, the plurality of reference positions described above may be set at regular intervals or may be set at irregular intervals (different intervals).

The fluctuation caused by the reflected waves from the radio wave shield and the variation caused by the other factors also occur in the plurality of received power extracted based on the plurality of reference positions. Further distinguishing (the received power of) the fluctuation caused by the reflected waves from the radio wave shield and (the received power of) the variation caused by the other factors, among the plurality of received power, is useful to calculate highly accurate regression coefficients and improve the estimation accuracy using the regression coefficients.

However, when, for example, reference positions of one hundred points are set, it is not easy to recognize which reference position (received power measured in the vicinity of the reference position) adequately represents the fluctuation caused by the reflected waves from the radio wave shield (i.e., contributes to the fluctuation). More specifically, randomly selecting a combination of several reference positions from among the reference positions of one hundred points and determining the combination that increases the estimation accuracy from among the selected combinations, are considered. However, even if the reference positions (i.e., the received power measured in the vicinity of the reference positions) determined in this manner are used, the estimation accuracy is excellent for certain data but not sufficient for different data, which lacks robustness. In addition, in this case, the number of combinations becomes huge depending on the number of reference positions, and the amount of processing increases.

Therefore, in the present embodiment, Variable Influence on Projection (VIP), which is used in component analysis of spectra, is applied as an example of an indicator for fluctuation caused by the reflected waves of the radio wave shields (i.e., the fluctuation in received power that occurs depending on the presence or absence of the radio wave shield).

Incidentally, the spectrum is usually expressed as absorbance with respect to normal wavelength, and is used to obtain the appropriate wavelength. More specifically, wavelengths of high importance have a larger VIP (value), and one criterion for determining the wavelength of high importance is whether or not the VIP is greater than or equal to 1.

In the present embodiment, the VIP calculated by treating the received power extracted based on each of the plurality of reference positions (i.e., the received power measured in the vicinity of the reference position) as a spectrum is used to set (select) (a partial area on the route including) the reference position where fluctuation caused by the reflected waves from the radio wave shield can be appropriately observed as the target area. Incidentally, VIP is calculated by following Equation (23).

$$VIP_k = \frac{n\sum_{i=1}^{M} V_i^2 W_{ki}^2}{\sum_{i=1}^{M} V_i^2} \quad \text{Equation 23}$$

In Equation (23), k is the index of the explanatory variable, which is indicative of the index of the reference position in the present embodiment. n is indicative of the number of reference positions (explanatory variables). i is indicative of the index of the component to be extracted in the PLS regression. L is indicative of the number of components to be extracted in the PLS regression. W is the n×L correlation matrix in Equation (20), which is obtained in the process of calculating the regression coefficients in the PLS regression. In this case, $W_{ki}^2$ is indicative of the square of the component in the k-th row and i-th column of W. $V_i$ is expressed as indicated by following Equation (24).

$$V_i = u_i^T t_i \quad \text{Equation 24}$$

As shown by Equation (24), $V_i$ is calculated from $u_i$ and $t_i$, which are obtained in the process of calculating the regression coefficients in the PLS regression. In other words, $V_i$ is a scalar quantity obtained from the matrix U (=[$u_1$ . . . $u_L$]) and matrix T (=[$t_1$ . . . $t_L$]). Incidentally, $u_i$ is indicative of the vector in i-th column of matrix U, $t_i$ is indicative of the vector in i-th column of matrix T, and "T" denotes transposition.

In the present embodiment, the processor 31 generates a matrix whose components are the received power measured in the vicinity of the plurality of reference positions every time each of the plurality of moving vehicles 1 moves.

A concrete example of the matrix generated by the processor 31 will be described. It is assumed that, for example, the plurality of moving vehicles 1 include a first moving vehicle and a second moving vehicle, and that each of the first moving vehicle and the second moving vehicle moves along the route twice in a state in which a radio wave shield is arranged and in a state in which a radio wave shield is not arranged.

In this case, the received power measured by the first moving vehicle in at a position the vicinity of each of the plurality of reference positions on the first lap of the route in a state in which the radio wave shield is arranged is assumed to be the component of the first line. Similarly, the received power measured by the second moving vehicle in at a position the vicinity of each of the plurality of reference positions on the first lap of the route in a state in which the radio wave shield is arranged is assumed to be the component of the second line. Furthermore, the received power measured by the first moving vehicle in at a position the vicinity of each of the plurality of reference positions on the second lap of the route in a state in which the radio wave shield is arranged is assumed to be the component of the third line. Similarly, the received power measured by the second moving vehicle in at a position the vicinity of each of the plurality of reference positions on the second lap of the route in a state in which the radio wave shield is arranged is assumed to be the component of the fourth line.

In addition, the received power measured by the first moving vehicle in at a position the vicinity of each of the plurality of reference positions on the first lap of the route in a state in which the radio wave shield is not arranged is assumed to be the component of the fifth line. Similarly, the received power measured by the second moving vehicle in at a position the vicinity of each of the plurality of reference positions on the first lap of the route in a state in which the radio wave shield is not arranged is assumed to be the component of the sixth line. Furthermore, the received power measured by the first moving vehicle in at a position the vicinity of each of the plurality of reference positions on the second lap of the route in a state in which the radio wave shield is not arranged is assumed to be the component of the seventh line. Similarly, the received power measured by the second moving vehicle in at a position the vicinity of each of the plurality of reference positions on the second lap of the route in a state in which the radio wave shield is not arranged is assumed to be the component of the eighth line.

According to this, the processor 31 can generate a matrix having the received power with 8 (rows)×the number of reference positions (columns) as components. Incidentally, the number of rows in the matrix generated by the processor 31 corresponds to "the number of moving vehicles (in this case, 2)×the number of laps of the moving vehicles (in this case, 2 laps)×the presence or absence of the radio wave shield (in other words, 2)".

Based on the matrix X ($x_{11}$, . . . , $x_{mn}$) of Equation (19) generated in this manner, and Y ($y_1$, . . . , $y_m$) corresponding thereto, the processor 31 can VIP for each reference position by applying the matrix obtained in the flow of the regression coefficient calculation method in the above-described PLS regression to the above-described Equation (23). The processor 31 sets the target area, based on the VIP thus calculated for each reference position.

The target area set by the processor 31 will be concretely described with reference to FIG. 18 through FIG. 20.

Figure 18:
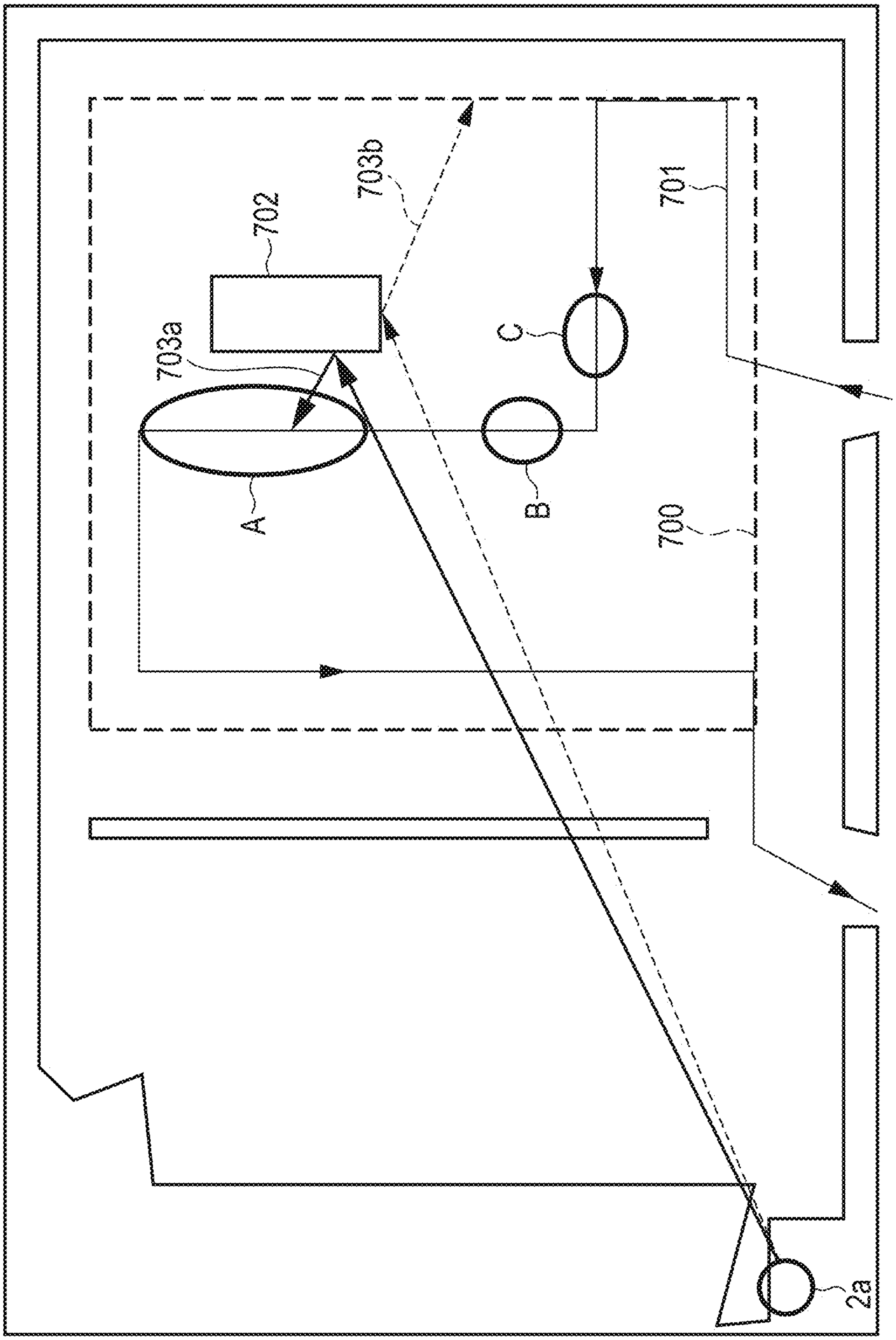
FIG. 18 is a diagram specifically illustrating the target area.

It is assumed that the received power is measured by a plurality of moving vehicles 1 repeatedly moving along the route 701 in the target space 700 shown in FIG. 18. FIG. 19 shows the received power measured in the vicinity of the plurality of reference positions set on the route 701 shown in FIG. 18, in the form of the received power map. In the example shown in FIG. 19, 42+56+35=133 reference points are set in the vicinity of a radio wave shield 702 shown in FIG. 18, and the received power measured by each of, for example, ten moving vehicles 1 moving twice for the presence or absence of the radio wave shield (i.e., the received power measured in the vicinity of the reference positions) is shown. FIG. 20 shows the VIP (characteristics) calculated for each of the 133 reference positions shown in FIG. 19.

Figure 19:
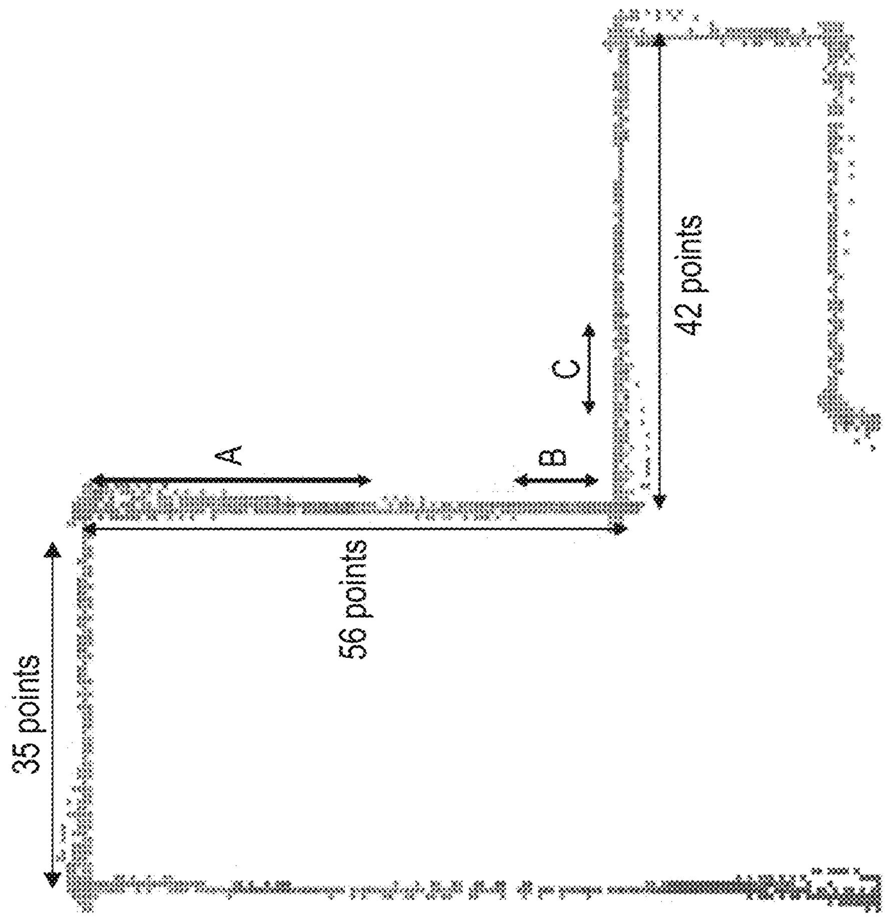
FIG. 19 shows an example of a received power map to specifically illustrate the target area.
Figure 20:
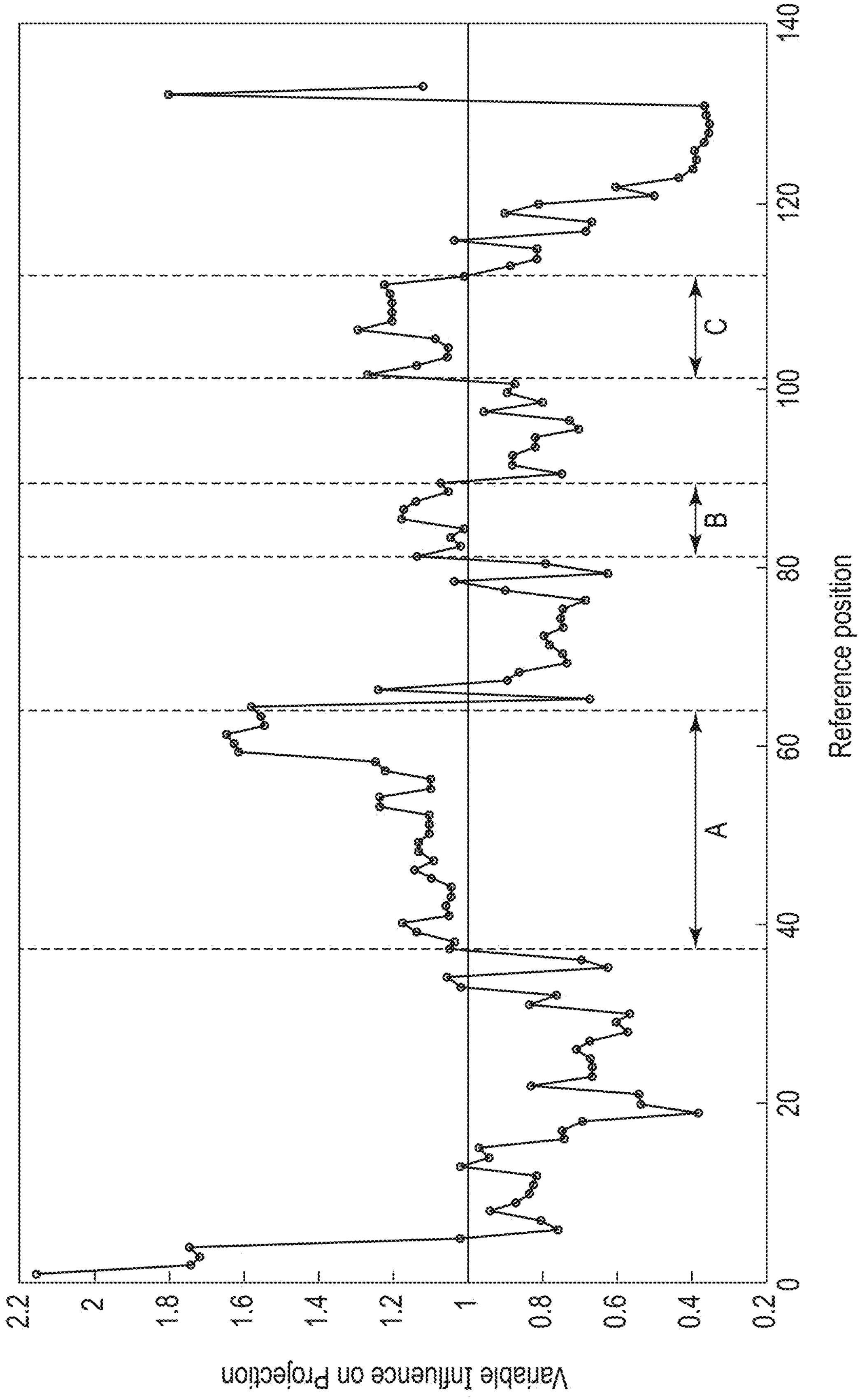
FIG. 20 shows VIP performance for each reference position to specifically illustrate the target area.

When one criterion is that the VIP is greater than or equal to 1 as described above, then (the reference positions included in) areas A to C on the route where the VIP continuously exceeds 1, which are shown in FIG. 18 to FIG. 20, can be set to appropriate areas (locations) to be used for the regression. In this case, the processor 31 sets (selects) the areas A to C as target areas based on the VIP.

It has been described that the target areas are set based on the VIP calculated for each reference position, but appropriate target areas may not be able to be set only by applying the VIP. More specifically, the areas A to C are set as target areas in the examples shown in FIG. 18 to FIG. 20. According to the reflected waves 703*a* and 703*b* from the radio wave shield 702 arranged in the target space 700 when the moving vehicle 1 moves along the route and measures the received power, however, the areas B and C may not be considered as target areas where the received power appropriately indicating the fluctuations caused by the reflected waves can be measured (i.e., may be affected by the factors other than the reflected waves).

For this reason, in the present embodiment, the processor 31 considers, for example, the positions of the antenna 2*a* which is a signal emission source and the radio wave shield 702, and geometrically obtains the reflected wave from the radio wave shield 702. The processor 31 may set the target area based on the reflected wave thus obtained from the radio wave shield 702. In other words, in the present embodiment, the modeling (formulation) as indicated by Equation (1) is based on the assumption that the reflected waves from the radio wave shield 702 are targeted. By considering the reflected waves geometrically obtained from the radio wave shield 702 as described above, the areas B and C presumed to give no favorable influence to the estimation of the presence or absence of the radio wave shield 702 can be excluded from the target area.

In order to set an appropriate target area (reference position) as described above, both the VIP and the area where the variation of received power caused by the reflected waves geometrically obtained from the positional relationship between the antenna 2*a* and the radio wave shield 702 can be considered. In this case, the area where the variation of the received power caused by the reflected waves from the radio wave shield 702 can be geometrically observed can be roughly selected (estimated), and a limited area with the VIP from the selected area can be set as the target area. In addition, for example, if the layout of the target space 700 (factory or warehouse) is complicated and it is difficult to understand the mechanism of the reflected waves from the radio wave shield 702, the target area may be set in consideration of the possibility of observing the variation in received power caused by the reflected waves from the radio wave shield 702, which is calculated geometrically from the selected area. As an application, not only the reflected waves from the radio wave shield 702 but also diffracted or scattered waves may be further considered. In addition, in FIG. 19, the reflected waves from the radio wave shield 702 are considered as two-dimensional waves, but such reflected waves may be considered as three-dimensional waves.

Figure 10:
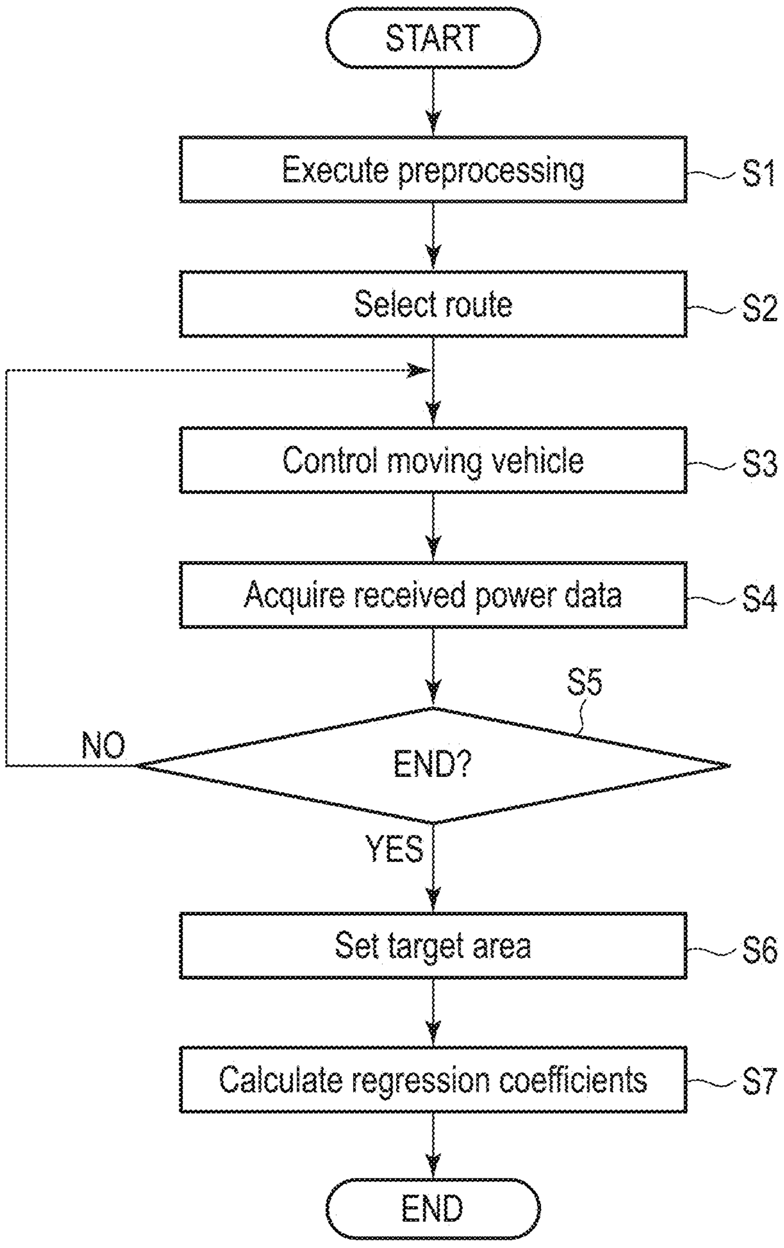
FIG. 10 is a flowchart showing an example of a procedure of a learning process.

Description returns to those of FIG. 10. The processor 31 (calculation module 31*e*) calculates the regression coefficients based on the received power measured in the vicinity of the reference position included in the target area set in step S6 (step S7).

The received power is measured in a state in which the presence or absence of the radio wave shield is already known as described above. In step S7, the processor 31 forms a matrix of (values indicative of) the presence or absence of the radio wave shield and the received power measured in the vicinity of the reference position included in the target area. In this case, the presence or absence of the radio wave shield at each lap of the route by the plurality of moving vehicles 1 is substituted into Y ($y_1, \ldots, y_m$) in the above Equation (19). More specifically, for example, 1 is substituted into $y_1$ of Y in Equation (19) if a radio wave shield is arranged when the plurality of moving vehicles 1 moves along the route of a first lap, and 0 is substituted into $y_m$ of Y in Equation (19) if no radio wave shield is arranged when the plurality of moving vehicles 1 moves along the route of a first lap.

It has been described that the presence or absence of the radio wave shield is expressed quantitatively as y=1 and y=0, but the value of y in a case where the radio wave shield is present may be expressed by a decimal such as y=0.6 or y=0.4, in accordance with the radio wave shielding degree of the radio wave shield. The same operation is also applied to the value of y in a case where the radio wave shield is absent.

Furthermore, in step S7, the received power measured in the vicinity of the reference position included in the above-described target area is substituted into X ($x_{11}, \ldots, x_{mn}$) in Equation (19).

Incidentally, m in Equation (19) corresponds to the total number of laps in which the plurality of moving vehicles 1 move, and n in Equation (19) corresponds to the number of reference positions included in the target area.

Incidentally, the received power measured in the vicinity of the reference positions included in the target area is considered as a power spectrum, and the received power is converted from decibel values to linear values, which are substituted into X in Equation (19).

The processor 31 calculates the regression coefficients β ($\beta_1, \ldots, \beta_n$), based on Equation (19) (hereinafter referred to as the learning data), in which the already known presence or absence of the radio wave shield is substituted into Y ($y_1, \ldots, y_m$) as described above and the received power measured in the vicinity of the reference position included in the target area is substituted into X ($x_{11}, \ldots, x_{mn}$). Incidentally, since Equation (19) follows the above-described theories of Equations (1) to (12), excellent regression coefficients for estimating the presence or absence of the radio wave shield can be calculated according to the above-described learning data.

Incidentally, the PLS regression is used to calculate the regression coefficients in step S7. Since the orthogonal components (i.e., components having a low correlation) are extracted in the PLS regression as described above, the influence of multicollinearity can be suppressed.

Since the regression coefficients calculated in step S7 as described above are used for the estimation process to be described below, the regression coefficients are held in the processor 31 (estimation module 31*f*).

It has been described that in the present embodiment, the target area is set using all the number of laps and all the moving vehicles 1 of the received power measured in the vicinity of the plurality of reference positions (hereinafter referred to as reference received power) when the plurality of moving vehicles 1 repeatedly move along the route. However, the target area may be set using some of the laps and some of the moving vehicles 1.

More specifically, as shown in FIG. 16 described above, since the received power data includes the moving vehicle ID, the individual characteristics of each moving vehicle 1 in the above-described reference received power (received power included in the received power data) can be recognized based on the moving vehicle ID. It is desirable to use all of the reference received power (i.e., the received power measured by all of the plurality of moving vehicles 1) for efficiency. For example, the received power measured by a specific moving vehicle 1 may be excluded from the reference received power to set the target area, in consideration of the fact that the received power is varied due to individual differences in moving vehicles 1.

Furthermore, the density of the plurality of moving vehicles 1 moving along the route in the same time zone or the distance between the moving vehicles 1 may be recognized based on the time (i.e., the time when the received power is measured) and the position (i.e., the position of the moving vehicle 1 when the received power is measured), and the received power measured in the moving vehicles 1 in which the density is greater than or equal to a predetermined value or the distance between the moving vehicles 1 is less than a predetermined value may be excluded from the reference received power, to set the target area.

In addition, in the present embodiment, for example, the target area may be set by excluding the received power that is considered to be an outlier from the reference received power.

More specifically, if the tendency of the received power measured by a specific moving vehicle 1 (i.e., the received power included in the received power data including the moving vehicle ID to identify the moving vehicle) is different from the received power measured by the other moving vehicle 1, the received power measured by the specific moving vehicle 1 may be excluded from the reference received power. The different tendency of the received power may be determined by, for example, comparing an average value of the received power of each moving vehicle 1 for each reference position, or the like, or by other methods.

Furthermore, for example, if the tendency of the received power measured in a specific number of laps is different or if the position of the moving vehicle 1 in a specific number of laps is significantly shifted, the received power measured in the number of laps may be excluded from the reference received power.

In addition, in the present embodiment, the received power measured at the position with the shortest distance from the reference position is used. If the distance (shortest distance) is greater than or equal to a threshold value, the received power and received power measured in the same lap as the reference power may be excluded from the reference received power.

Incidentally, excluding a part of the reference received power has been described. However, the target area may be set using all of the reference received power by lowering the weight of the received power which is described to be excluded or by offsetting the received power.

In addition, a part of the reference received power that matches a specific condition based on the moving vehicle ID, number of laps, time, and position included in the received power data may be extracted, and the target area may be set using the extracted part of the reference received power. In other words, in the present embodiment, the received power (i.e., part of the reference received power) used to set the target area (i.e., to calculate the VIP) may be specified based on at least one of the moving vehicle ID, number of laps, time, and position included in the received power data.

Incidentally, setting the target area (i.e., calculating the VIP) using the part of the reference received power has been described. The number of received power used to set the target area desirably matches (i.e., is the same) in each of the state in which the radio wave shield is arranged in the target space and the state in which the radio wave shield is not arranged in the target space.

In addition, when the target area is set using part of the reference received power as described above, the regression coefficient is calculated within the range of the part of the reference received power used to set the target area (i.e., calculated using the received power measured in the vicinity of the reference position in the target area, of the part of the reference received power).

In addition, for example, if a stationary sensor (i.e., a sensor that measures the received power) is arranged on a ceiling, floor, wall surface, or the like, which forms the target space, the received power measured by the stationary sensor (i.e., the received power transmitted from the stationary sensor to the information processing apparatus 3) may be used as at least the part of the above-described reference received power. In other words, the stationary sensor may be used as part of the function for measuring the received power included in the moving vehicle 1 (i.e., the received power measurement module 14).

Incidentally, for example, a learning model and the like generated based on a technology referred to as Artificial Intelligence (AI) may be used for setting the target area and calculating the regression coefficients in the present embodiment.

Next, an example of a procedure of the above-described estimation process will be described with reference to a flowchart of FIG. 21.

In the estimation process, map data and a received power map are generated by executing the process of step S11 corresponding to the above-described process of step S1 shown in FIG. 10 as preprocessing (preparation) for estimating the presence or absence of the radio wave shield. The map data and the received power map thus generated are stored in the storage 32.

Incidentally, when the map data and the received power map generated in the above-described process shown in FIG. 10 can be used in the estimation process, the process of step S11 may be omitted.

When the process of step S11 is executed, the operation of the moving vehicle control system can be started. In this case, the processor 31 (control module 31*g*) included in the information processing apparatus 3 selects a route in which the moving vehicle 1 in the target space moves, based on the map data and the received power map stored in the storage module 32 (step S12).

In step S12, for example, the processor 31 executes cost calculation in consideration of the received power at the position (space) which overlaps the route for each of the plurality of routes from a start point to a goal point set on a map indicated by the map data, and selects an optimum route from among the plurality of routes, based on the result of the cost calculation.

The cost calculation for selecting the route will be briefly described below. First, the processor 31 acquires the received power allocated to each position (pixel) corresponding to each of the plurality of routes (i.e., the shortest route, the intermediate route, the longest route, and the like) from the start point to the goal point, by referring to the received power map. The processor 31 classifies the acquired received power into “strong”, “medium”, and “weak”, based on a plurality of threshold values prepared in advance. In this case, for example, the value (cost) corresponding to “strong” is set to 1, the value (cost) corresponding to “medium” is set to 2, and the value (cost) corresponding to "weak" is set to 3, and the processor 31 calculates the cost of each route by adding the values corresponding to the results ("strong", "medium", and "weak") into which the received power allocated to each position corresponding to each route is classified, for each route. The processor 31 selects, for example, the route for which the cost thus calculated is the lowest.

According to the cost calculation, for example, when an insensitive area (i.e., the area in which the received power is deteriorated) does not occur in the target space, the cost of the shortest route is the lowest, and the shortest route is selected. In contrast, for example, when the insensitive area occurs on the shortest route, the cost of the shortest route increases and, for example, the intermediate route is selected. Furthermore, when the insensitive area occurs on the shortest route and the intermediate route, for example, the longest route is selected.

Incidentally, for example, the deterioration of the received power in the insensitive area is considered to be suppressed by using time diversity, frequency diversity, or spatial diversity. In the present embodiment, however, a route avoiding the insensitive area is selected with priority given to the more stable operation (movement) of the moving vehicle 1.

When the process of step S12 is executed, the processor 31 (control module 31*g*) controls the moving vehicle 1 to move along the route selected in step S12 (step S13). The process of step S13 is the same as the above-described process of step S3 shown in FIG. 10, and its detailed description is omitted here.

When the above-described process of step S13 is executed, the moving vehicle 1 moves along the route selected in step S12 from the start point to the goal point. The moving vehicle 1 is assumed to transmit the above-described data for map generation and received power data to the information processing apparatus 3 via the base station 2 at each position during the movement.

In this case, the processor 31 (acquisition module 31*a*) included in the information processing apparatus 3 acquires the data for map generation and the received power data transmitted from the moving vehicle 1 moving along the route selected in step S12 from the base station 2 (step S14).

When the process of step S14 is executed, the processor 31 (map data generation module 31*b*) updates the map data stored in the storage 32, based on the data for map generation acquired in step S14 (step S15). Incidentally, since only the data for map generation on the route selected in step S12 is acquired in step S14, only the portion near the route of the map indicated by the map data is updated in step S15.

Furthermore, the processor 31 (received power map generation module 31*c*) updates the received power map stored in the storage 32, based on the data for map generation and the received power data acquired in step S14 (step S16).

If a route which can avoid the insensitive area (for example, the route 400A shown in FIG. 8) is selected in step S12 described above, only the data for map generation and the received power data on the route are acquired in step S14. For this reason, only the received power allocated to each position on the route, which avoids the insensitive area of the received power map, is updated in step S16.

In other words, in the received power map updated in step S16 described above, it is impossible to recognize whether or not the insensitive area on the route along which the moving vehicle 1 does not move is eliminated.

The insensitive area is eliminated by, for example, removing the radio wave shield, and the moving vehicle 1 in the present embodiment may be able to detect the presence or absence of an obstacle arranged in the target space by the LRF. However, since, for example, the height of the obstacle cannot be discriminated by the LRF, the insensitive area may be eliminated when, for example, the height of the obstacle detected by the LRF is small. Furthermore, for example, when the obstacle detected by the LRF is not the radio wave shield, the insensitive area may be eliminated even when the obstacle is detected. In other words, it is difficult for the LRF to estimate the elimination of the insensitive area (i.e., presence or absence of the radio wave shield).

Therefore, in the present embodiment, the processor 31 (estimation module 31*f*) estimates the presence or absence of the radio wave shield (i.e., whether or not the radio wave shield is removed), using the regression coefficients calculated by executing the above-described learning process (i.e., the regression coefficients held in processor 31) and the received power measured by the moving vehicle 1 moving along the route selected in step S12 (step S17).

Incidentally, when the process of step S17 is executed, the route selected in step S12 is assumed to be the same route selected in step S2 shown in FIG. 10 described above (i.e., the route for which the regression coefficients are calculated).

The process of step S17 will be described below. In step S17, the processor 31 acquires the received power measured at each position on the route by the moving along the route selected in step S12, from the received power map.

Incidentally, the received power acquired by the processor 31 is the received power measured in the vicinity of the reference position included in the target area among the reference positions set on the route in the above-described learning process. For convenience of description, the received power acquired by the processor 31 in this manner is denoted by $x_1, \ldots, x_n$. Incidentally, it is assumed that the information on (the reference position included in) the target area set in the learning process is held in the processor 31 when the learning process is executed.

In addition, the received power acquired by the processor 31 may be the received power measured by at least one moving vehicle, but may be the received power measured by a plurality of moving vehicles or the received power measured by one or more moving vehicles 1 repeatedly moving along the route.

Next, in step S17, the processor 31 calculates the value of y (hereinafter referred to as an estimated value) by substituting the regression coefficients ($\beta_1, \ldots, \beta_n$) held in the processor 31 and the received power ($x_1, \ldots, x_n$) acquired as described above into Equation (22), and estimates the presence or absence of the radio wave shield, based on the calculated estimated value.

The presence or absence of the radio wave shield can be estimated (determined) by the size of the estimated value relative to a threshold value. In one example, for example, 0.5 is set as the threshold value in a case where the regression coefficients are calculated on the assumption that y=1 when the radio wave shield is present and y=0 when the radio wave shield is absent as described above. According to this, the processor 31 can estimate presence of the radio wave shield when the estimated value is greater than or equal to 0.5, and can estimate absence of the radio wave shield when the estimated value is less than 0.5.

When the process of step S17 is executed, the processor 31 (estimation module 31*f*) reflects the result of estimation of the presence or absence of the radio wave shield in the step S17 on the received power map stored in the storage 32 (step S18). More specifically, if absence of the radio wave shield is estimated in step S17 described above, then it is determined that the propagation environment of the radio waves in the area including the position opposite to the antenna 2*a* across the position where the radio wave shield is arranged (i.e., the area located behind the radio wave shield as viewed from the antenna 2*a*) has improved, and the process of updating the receiving power map is executed to increase the receiving power allocated to the area, in step S18. In contrast, if the presence of the radio wave shield is estimated in step S17, it is assumed in step S18 that the radio wave propagation environment in the area located behind the radio wave shield is not improved, and the receiving power map is not updated.

When the above-described process of step S18 is executed, the flow returns to step S12 and the process is repeated. According to this, for example, if an insensitive area occurs on the route along which the moving vehicle 1 moves due to the arrangement of a new radio wave shield, for example, a route to avoid the insensitive area is selected based on the receiving power map updated in step S16 according to the deterioration in the receiving power in the insensitive area. In addition, if a route to avoid the insensitive area generated by the radio wave shield is selected in step S12 described above and if the absence of the radio wave shield is estimated in step S17, a route passing through the area located behind the radio wave shield (for example, the shortest route) can be selected based on the received power map that reflects on which the result of the estimation is reflected in step S18. In contrast, if the presence of the radio wave shield is estimated in step S17, the received power map is not updated and the received power in the area located behind the radio wave shield remains deteriorated, and selection of a route passing through the area can be therefore avoided.

In other words, in the present embodiment, the processor 31 (control module 31*g*) can control the moving vehicle 1 by selecting an appropriate route based on the above-mentioned estimation result of the presence or absence of the radio wave shield.

Figure 21:
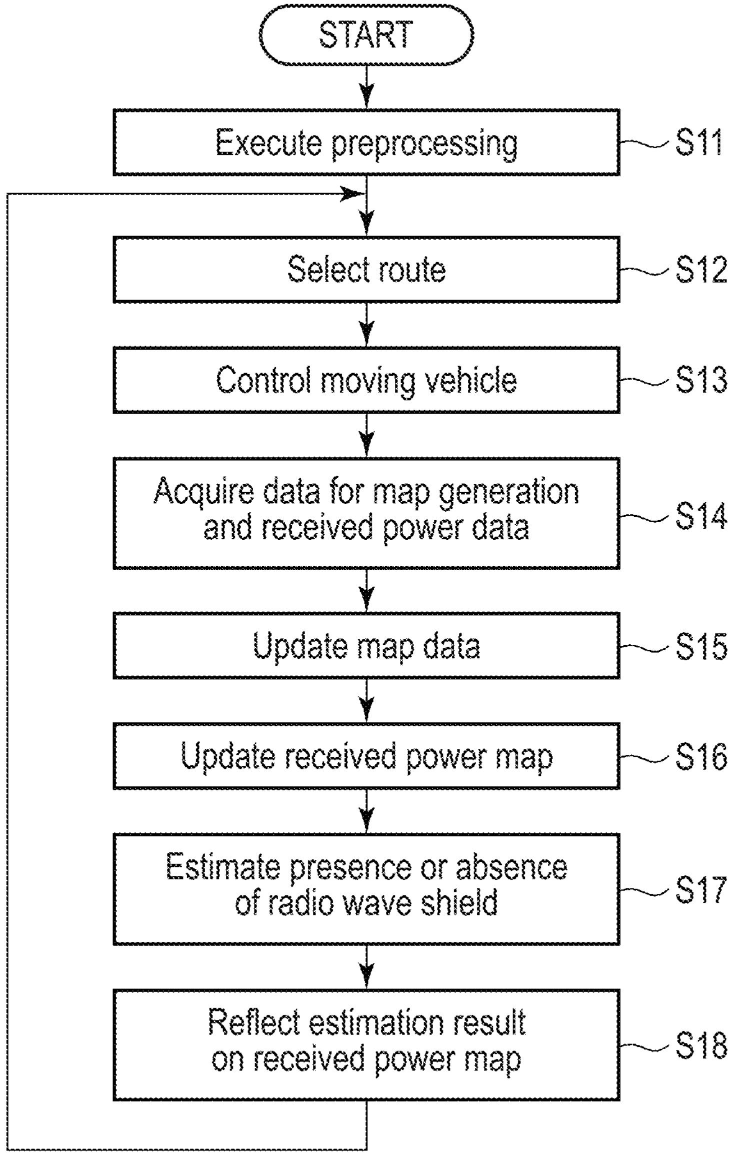
FIG. 21 is a flowchart showing an example of a procedure of an estimation process.

Incidentally, in FIG. 21, for example, a situation is assumed in which the moving vehicle 1 repeatedly moves along the route from the start point to the goal point set on the map indicated by the map data. The process shown in FIG. 21 may be ended at the timing at which, for example, a predetermined control of the moving vehicle 1 (i.e., transportation of luggage using the moving vehicle 1) is ended.

In addition, in step S18, it has been described that the receiving power map is updated to increase the received power allocated to the area located behind the radio wave shield when absence of the radio wave shield is estimated, but the received power allocated to the area may be deleted. According to this, a route passing through the area located behind the radio wave shield can be selected by executing the cost calculation such that the cost is set to 0 if no received power is allocated.

Furthermore, it has been described that the received power map is updated based on the result of the estimation of the presence or absence of the radio wave shield in step S17, in the process shown in FIG. 21. The estimation result may be used for controlling the moving vehicle 1 (for example, route selection, and the like). In addition, the estimation result of the presence or absence of the radio wave shield in step S17 may be used in the other processing or may be output from the information processing apparatus 3 to the external apparatus in order to be used in the processing executed in the external apparatus.

In addition, when the target area is set and the regression coefficients are calculated using only a part of the reference received power in the above-described learning process, the received power corresponding to the part of the reference received power is assumed to be used in the estimation process as well. More specifically, when the received power of a specific moving vehicle (moving vehicle ID) is not employed (excluded) in the learning process (setting of target area and calculation of regression coefficients), the received power of the moving vehicle may be excluded when estimating the presence of absence of the radio wave shield or the estimation results using the received power of the moving vehicle may be discarded.

A specific example of the operation of the information processing apparatus 3 in the estimation process will be described below with reference to the above-described example shown in FIG. 8. It is assumed that in a state in which the above learning process is already executed and the obstacle 402, which is a radio wave shield, is arranged and a state in which the obstacle 402 is not arranged, the regression coefficients are calculated based on the received power measured by the plurality of moving vehicles 1 repeatedly moving along the route 400A.

First, map data and a received power map are generated by moving the moving vehicle 1 in the target space shown in FIG. 8. Incidentally, it is assumed that the obstacle 402, which is the radio wave shield, is not arranged and an insensitive area does not occur in the target space (i.e., the radio wave propagation environment in the target space is excellent).

Next, the route along which the moving vehicle 1 moves is selected, based on the above-described map data and received power map. It is assumed that the route 400B is the shortest route compared to the route 400A and that the route 400B is selected.

When the route 400B is selected as described above, the moving vehicle 1 is controlled to move (carry a load) from the start point to the goal point along the route 400B.

Incidentally, the moving vehicle 1 transmits the data for map generation and the received power data at each position on the route 400B while moving along the route 400B. In this case, the map data and the received power map are updated, based on the data for map generation and the received power data transmitted from the moving vehicle 1.

It is assumed that the obstacle 402 is arranged while the moving vehicle 1 moves along the route 400B. In this case, the area opposed to the antenna 2*a* across the obstacle 402 (i.e., the back side of the obstacle 402 as viewed from the antenna 2*a*) becomes an insensitive area, and the received power map is updated to assign the deteriorated receiving power to the area.

According to such a received power map, the route 400A avoiding the insensitive area is selected as the route along which the moving vehicle 1 moves, and the moving vehicle 1 is controlled to move from the start point to the goal point along the route 400A.

Incidentally, the moving vehicle 1 transmits the data for map generation and the received power data at each position on the route 400A while moving along the route 400A. In this case, the map data and the received power map are updated, based on the data for map generation and the received power data transmitted from the moving vehicle 1.

The presence or absence of the radio wave shield (in this case, obstacle 402) is estimated, based on the regression coefficients calculated based on the received power measured by repeatedly moving the route 400A during the learning process as described above, and based on the received power measured by the moving vehicle 1 while moving along the route 400A during the estimation process (i.e., during the operation of the moving vehicle control system).

As a result of estimation that the radio wave shield is present, the area on the route 400B that is out of the line of sight of the antenna 2A due to the radio wave shield is regarded as an insensitive area, and the route 400A along which the moving vehicle 1 moves is not changed (i.e., the moving vehicle 1 is controlled to continue moving along the route 400A).

In contrast, as a result of estimation that the radio wave shield is absent, the area on the route 400B is not regarded as an insensitive area (i.e., the insensitive area which occurs due to the radio wave shield is eliminated), and the route 400A along which the moving vehicle 1 moves is changed to the route 400B (i.e., the moving vehicle 1 is controlled to move along the route 400B).

As described above, the information processing apparatus 3 of the present embodiment acquires the received power (first received power) on the route of the moving vehicle 1 passing between the antenna 2_a_ and the radio wave shield, based on the radio wave emitted from the antenna 2_a_ (signal emission source) in a state in which the radio wave shield is arranged in (the first position of) the target space, acquires the received power measured on the route (i.e., the second received power, which is the radio wave emitted from the signal emission source) in a state in which the radio wave shield is not arranged in (the first position of) the target space, and sets a part of the area on the route as a target area to be used for the process on the control of the moving vehicle 1, based on the index on the fluctuation of the acquired received power (i.e., the fluctuation between the first received power and the second received power).

Incidentally, in the present embodiment, the processing related to the control of the moving vehicle 1 is executed based on the received power (third received power) measured in the target area. The processing related to the control of the moving vehicle 1 includes, for example, a learning process to calculate coefficients (regression coefficients) used to estimate the presence or absence of a radio wave shield and an estimation process to estimate the presence or absence of a radio wave shield using the coefficients.

In the present embodiment, with the above-described configuration, highly accurate regression coefficients can be obtained using the received power measured in the target area by setting the target area where fluctuations in received power caused by the reflected waves from the radio wave shield can be observed appropriately.

In addition, since the presence or absence of the radio wave shield can be estimated with high accuracy using such regression coefficients in the present embodiment, a route which allows the moving vehicle to move efficiently can be selected based on the estimation result.

In other words, the information processing apparatus 3 according to the present embodiment can estimate the elimination of the insensitive area from the safe area based on the viewpoint of communication or control and is considered useful for efficiently controlling the moving vehicle 1, even when there is a large variation in received power.

In the present embodiment, the VIP is used as an index on the fluctuation in received power. Furthermore, in the present embodiment, the target area may be set based on the positions of the radio wave shield and the antenna 2_a_. According to this configuration, the target area which enables the fluctuation in received power caused by the reflected waves from the radio wave shield to be observed more appropriately can be set. In addition, in the present embodiment, a target area with high robustness (or versatility) can be set by using a large number of received power measured by a plurality of moving vehicles 1 that repeatedly move along the route.

Furthermore, in the present embodiment, (the value of) the VIP is calculated based on the received power measured at a position where the distance from the reference position set on the route each time the moving vehicle moves is less than or equal to a predetermined value (i.e., a position in the vicinity of the reference position). In the present embodiment, with such a configuration, even when the received power is measured at different positions on the same route, the influence of the variation in received power caused by the displacement of the position on the calculation of the regression coefficients and the estimation of the presence or absence of radio wave shield can be reduced.

In addition, in the present embodiment, the VIP is calculated based on a matrix whose components are the received power measured in the vicinity of the reference position at each lap. The present embodiment has an advantage that an area where the fluctuation in received power caused by the reflected waves from the radio wave shield can be observed by treating the received power as a matrix of positions and laps (samples). In addition, the received power in the form of such a matrix is easy to handle in estimating the presence or absence of the radio wave shield by the regression operations.

In addition, the regression coefficients become unstable when the columns of the matrix have a strong correlation (multicollinearity). In the present embodiment, since the coefficients are calculated by applying the PLS regression, which extracts orthogonal components, i.e., components with low correlation, the influence of the multicollinearity can be suppressed.

Incidentally, the received power used to calculate the VIP in the present embodiment may be part of the received power measured by the plurality of moving vehicles 1 that repeatedly move along the route. More specifically, the received power from which outliers, and the like are excluded based on at least one of the moving vehicle ID, number of lapses, time, and position included in the received power data can be specified, and the VIP can be calculated using such specified received power. In the present embodiment, a more appropriate target area can be set by such a configuration.

The communication state based on the relationship between the presence or absence of an actual radio wave shield (obstacle 402) in the target space shown in FIG. 8 and the estimation result on the presence or absence of the radio wave shield will be described with reference to FIG. 22.

Figure 22:
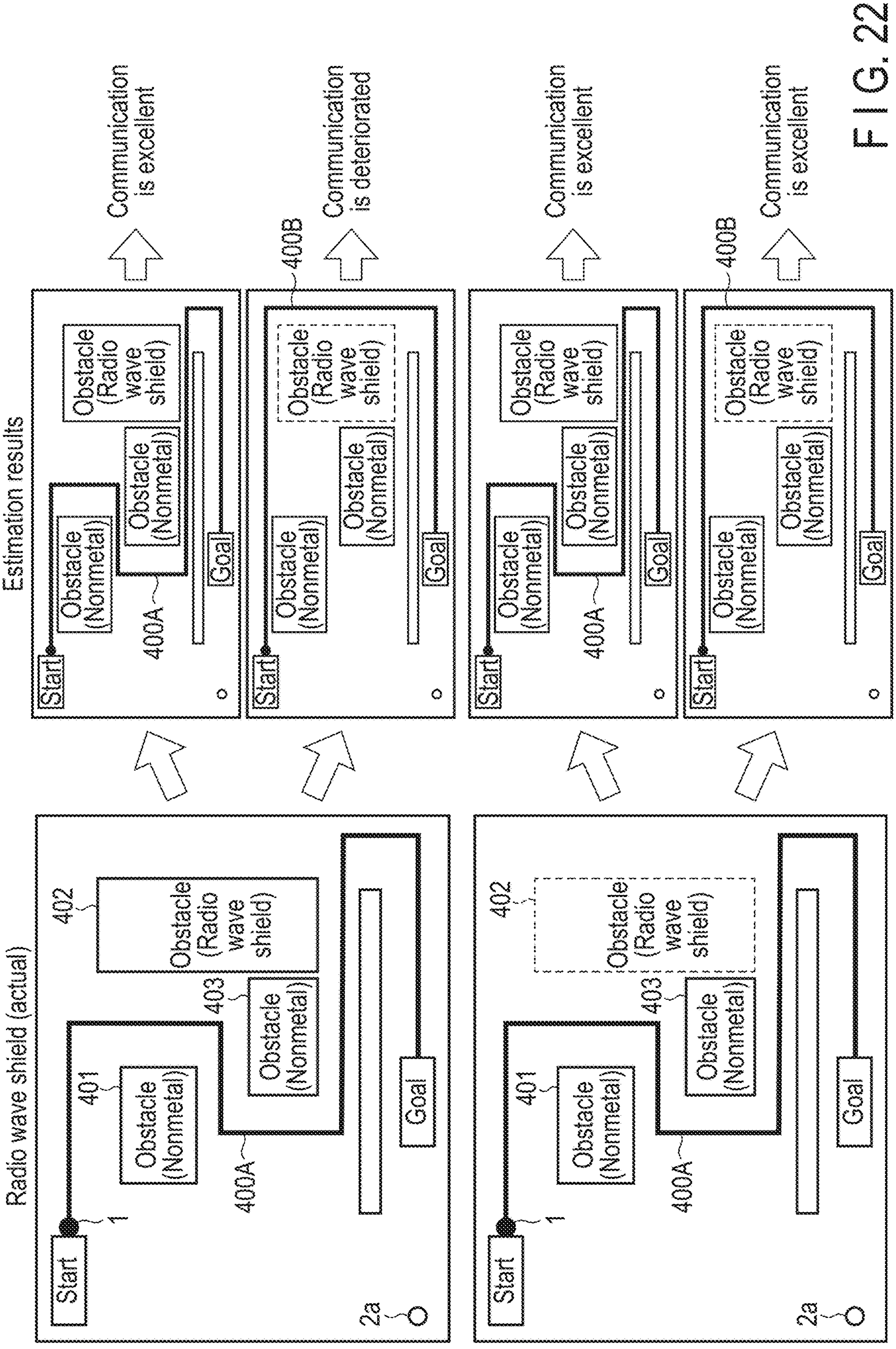
FIG. 22 is a diagram illustrating a communication state based on a relationship between the actual presence or absence of a radio wave shield and the result of estimation of the presence or absence of the radio wave shield.

As shown in FIG. 22, if the presence of the radio wave shield is estimated when the moving vehicle moves along the route 400A in a state in which the radio wave shield is actually present, the estimation result is correct. According to this estimation result, since the moving vehicle 1 continuously moves along the route 400A, the communication executed between the moving vehicle 1 and the antenna 2_a_ is considered excellent.

In contrast, if the absence of the radio wave shield is estimated when the moving vehicle moves along the route 400A in a state in which the radio wave shield is actually present, this estimation result is incorrect. According to this estimation result, the route along which the moving vehicle 1 moves is changed from the route 400A to the route 400B. Since the radio wave shield (obstacle 402) is actually arranged, the communication executed between the moving vehicle 1 moving behind the radio wave shield and the antenna 2*a* is deteriorated.

Furthermore, if the presence of the radio wave shield is estimated when the moving vehicle moves along the route 400A in a state in which the radio wave shield is not actually present, this estimation result is incorrect. According to this estimation result, since the moving vehicle 1 continuously moves along the route 400A, the communication executed between the moving vehicle 1 and the antenna 2*a* is considered excellent.

In contrast, if the absence of the radio wave shield is estimated when the moving vehicle moves along the route 400A in a state in which the radio wave shield is not actually present, this estimation result is correct. According to this estimation result, the route along which the moving vehicle 1 moves is changed from the route 400A to the route 400B. In this case, since the radio wave shield (obstacle 402) is not actually arranged, the communication executed between the moving vehicle 1 and the antenna 2*a* is considered excellent.

In other words, four combinations of the actual presence or absence of the radio wave shield and the estimation result of the presence or absence of the radio wave shield are considered, but the minimum cases that need to be avoided are limited. More specifically, for example, if it is estimated that the radio wave shield is present in a case where the radio wave shield is actually absent, this estimation result is incorrect, and the route 400A is not changed although the radio wave shield is actually absent. In this case, however, the excellent communication between the moving vehicle 1 and the antenna 2*a* is maintained although the improvement in the conveyance efficiency of loads, which is made by the movement along the route 400B, cannot be achieved. In contrast, if it is estimated that the radio wave shield is absent in a case where the radio wave shield is actually present, this estimation result is incorrect, and the route 400A is changed to the route 400B although the radio wave shield is actually present. In this case, since the moving vehicle 1 moves behind the radio wave shield by moving along the route 400B, the communication between the moving vehicle 1 and the antenna 2*a* may be deteriorated and the moving vehicle 1 may become uncontrollable.

Therefore, if the excellent communication can be maintained even in a case where the estimation result is incorrect, the estimation result is not considered to give a significant influence to the operation of the moving vehicle control system. However, if the estimation result is incorrect and the communication is deteriorated, the estimation result gives an influence to the operation of the moving vehicle control system. For this reason, in the present embodiment, it is desirable to avoid a case where it is estimated that a radio wave shield is absent even though the radio wave shield is actually present.

For this reason, in the present embodiment, in consideration of the above-described circumstances, a situation in which the moving vehicle 1 becomes uncontrollable since the moving vehicle 1 moves behind the radio wave shield even though the radio wave shield is actually present, may be avoided as much as possible, by employing the configuration of not changing the route, based on one estimation result, but changing the route, using, for example, a plurality of estimation results obtained by executing the estimation process a plurality of times. More specifically, for example, the route may be changed only when the estimation result that the radio wave shield is absent is obtained for a predetermined number of consecutive times.

In addition, in the present embodiment, it has been described that the threshold value to be compared with the estimated value to estimate the above-described presence or absence of the radio wave shield is 0.5, but the threshold value may be other than 0.5. Incidentally, since it is assumed that the estimated value calculated in the estimation process is different depending on (layout and the like of) the target space, for example, a training period for executing the estimation of the presence or absence of the radio wave shield a plurality of times by using the regression coefficients calculated in the learning process in a state in which the presence or absence of the radio wave shield is already known, may be set, and an appropriate threshold value may be set where the estimation results obtained during the training period match the already known presence or absence of the radio wave shield.

Incidentally, it has been described that in the present embodiment, as shown in FIG. 6, the processor 31 includes the calculation module 31*e* and the estimation module 31*f* (i.e., the information processing apparatus 3 includes both the function of calculating the regression coefficients and the function of estimating the presence or absence of the radio wave shield) as shown in FIG. 6. However, the information processing apparatus 3 of the present embodiment may be configured to include only one of the functions (i.e., to execute only one of the above-described learning process and estimation process).

Furthermore, the information processing apparatus 3 of the present embodiment needs only to include, for example, a function of setting a target area useful for executing the process related to the control of the moving vehicle 1, and the function of calculating the regression coefficients and the function of estimating the presence or absence of the radio wave shield may be arranged outside the information processing apparatus 3.

In addition, it has been mainly described that a plurality of moving vehicles 1 repeatedly travel (move) along the route in the present embodiment, but the number of the moving vehicles 1 and the number of laps may be changed as appropriate. More specifically, the present embodiment can be realized by a configuration in which, for example, one moving vehicle 1 repeatedly moves along the route, or a configuration in which a plurality of moving vehicles 1 move along the route at each time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

With regard to the above-described embodiment, the following supplementary notes will be further disclosed.

(1)

An information processing apparatus including a processor configured to:

acquire first received power on a route of a moving vehicle passing between a signal emission source and a radio wave shield, based on radio waves emitted from the signal emission source, in a state in which the radio wave shield for blocking the radio waves is arranged at a first position;

acquire second received power, which is a radio wave emitted from the signal emission source and measured on the route, in a state in which the radio wave shield is not arranged at the first position; and set a part of an area on the route as a target area used for processing related to control of the moving vehicle, based on an index related to fluctuation between the first received power and the second received power.

(2)

The information processing apparatus of (1), wherein the index related to the fluctuation between the first received power and the second received power includes Variable Influence on Projection (VIP).

(3)

The information processing apparatus of (2), wherein the processor is configured to set the part of the area on the route as the target area, based on positions of the radio wave shield and the signal emission source.

(4)

The information processing apparatus of (2) or (3), wherein the first and second received power is measured by a plurality of moving vehicles moving along the route, the VIP is calculated based on the first and second received power measured at a position where a distance from a reference position set on the route at each movement is less than or equal to a predetermined value.

(5)

The information processing apparatus of (4), wherein the VIP is calculated based on a matrix in which the first and second received power measured at the position where the distance from the reference position at each movement is less than or equal to the predetermined value is components.

(6)

The information processing apparatus of one of (2) to (5), wherein the first and second received power is measured by a plurality of moving vehicles moving along the route, the processor is configured to acquire identification information for identifying the moving vehicle measuring the first received power and a position of the moving vehicle, and acquire identification information for identifying the moving vehicle measuring the second received power and a position of the moving vehicle, and the VIP is calculated based on part of the first and second received power specified using the position of the moving vehicle and the identification information.

(7)

The information processing apparatus of one of (2) to (6), wherein the first and second received power is measured by a plurality of moving vehicles moving along the route, the processor is configured to acquire the number of laps on the route during measuring the first received power, and acquire the number of laps on the route during measuring the second received power, and the VIP is calculated based on part of the first and second received power specified using the number of laps.

(8)

The information processing apparatus of one of (2) to (7), wherein the first and second received power is measured by a plurality of moving vehicles moving along the route, the processor is configured to acquire the time for the first received power is measured, and acquire the time for the second received power is measured, and the VIP is calculated based on part of the first received power and the second received power specified using the time.

(9)

The information processing apparatus of one of (1) to (8), wherein the processor is configured to execute a process related to the control of the moving vehicle, based on the third received power measured in the target area.

(10)

The information processing apparatus of (9), wherein the processor is configured to execute a process of estimating the presence or absence of the radio wave shield based on the third received power measured in the target area as the process related to the control of the moving vehicle.

(11)

The information processing apparatus of (10), wherein the processor is configured to control the mobile vehicle, based on the estimation result.

(12)

The information processing apparatus of one of (9) to (11), wherein the processor is configured to execute a process of calculating a coefficient used to estimate the presence or absence of the radio wave shield, based on the third received power measured in the target area, which is part of the first and second received power, as the process related to the control of the moving vehicle.

(13)

The information processing apparatus of (12), wherein the processor is configured to calculate the coefficient by applying Partial Least Squares (PLS) regression.

(14)

A system including:

the information processing apparatus of one of (1) to (13); and the signal emission source.

(15)

The system of (14), further including the moving vehicle.

(16)

A non-transitory computer-readable storage medium having stored thereon a program which is executed by a computer of an information processing apparatus, the program including instructions capable of causing the computer to execute function of:

acquiring first received power on a route of a moving vehicle passing between a signal emission source and a radio wave shield, based on radio waves emitted from the signal emission source, in a state in which the radio wave shield for blocking the radio waves is arranged at a first position;

acquiring second received power, which is a radio wave emitted from the signal emission source and measured on the route, in a state in which the radio wave shield is not arranged at the first position; and setting a part of an area on the route as a target area used for processing related to control of the moving vehicle, based on an index related to fluctuation between the first received power and the second received power.

What is claimed is:

1. An information processing apparatus comprising a processor configured to:

control a moving vehicle to move on a route, via a signal emission source that emits radio waves;

acquire, from the moving vehicle, a first received power of a radio wave emitted by the signal emission source and measured by the moving vehicle on the route, in a state in which a radio wave shield that blocks the radio waves is arranged at a first position;

acquire, from the moving vehicle, a second received power of a radio wave emitted from the signal emission source and measured on the route by the moving vehicle, in a state in which the radio wave shield is not arranged at the first position; and set a part of an area on the route as a target area used for processing related to control of the moving vehicle, based on an index related to fluctuation between the first received power and the second received power caused according to presence or absence of the radio wave shield and calculated for each of reference positions set on the route based on the first received power, the second received power and a value which varies depending on the presence or absence of the radio wave shield.

2. The information processing apparatus of claim 1, wherein the index related to the fluctuation between the first received power and the second received power includes Variable Influence on Projection (VIP).

3. The information processing apparatus of claim 2, wherein the processor is configured to set the part of the area on the route as the target area, based on positions of the radio wave shield and the signal emission source.

4. The information processing apparatus of claim 2, wherein the first and second received power is measured by a plurality of moving vehicles moving along the route, and the VIP is calculated based on the first and second received power measured at a position where a distance from the reference positions set on the route at each movement is less than or equal to a predetermined value.

5. The information processing apparatus of claim 4, wherein the VIP is calculated based on a matrix in which the first and second received power measured at the position where the distance from the reference positions at each movement is less than or equal to the predetermined value is components.

6. The information processing apparatus of claim 2, wherein the first and second received power is measured by a plurality of moving vehicles moving along the route, the processor is configured to acquire identification information for identifying the moving vehicle measuring the first received power and a position of the moving vehicle, and acquire identification information for identifying the moving vehicle measuring the second received power and a position of the moving vehicle, and the VIP is calculated based on part of the first and second received power specified using the position of the moving vehicle and the identification information.

7. The information processing apparatus of claim 2, wherein the first and second received power is measured by a plurality of moving vehicles moving along the route, the processor is configured to acquire a first number of laps on the route during measuring the first received power, and acquire a second number of laps on the route during measuring the second received power, and the VIP is calculated based on part of the first and second received power specified using the first number of laps and the second number of laps.

8. The information processing apparatus of claim 2, wherein the first and second received power is measured by a plurality of moving vehicles moving along the route, the processor is configured to acquire a first time when the first received power is measured, and acquire a second time when the second received power is measured, and the VIP is calculated based on part of the first received power and the second received power specified using the first time and the second time.

9. The information processing apparatus of claim 1, wherein the processor is configured to execute a process related to the control of the moving vehicle, based on the third received power measured in the target area.

10. The information processing apparatus of claim 9, wherein the processor is configured to execute a process of estimating the presence or absence of the radio wave shield based on the third received power measured in the target area as the process related to the control of the moving vehicle.

11. The information processing apparatus of claim 10, wherein the processor is configured to control the mobile vehicle, based on a result of the process of estimating the presence or absence of the radio wave shield.

12. The information processing apparatus of claim 9, wherein the processor is configured to execute a process of calculating a coefficient used to estimate the presence or absence of the radio wave shield, based on the third received power measured in the target area, which is part of the first and second received power, as the process related to the control of the moving vehicle.

13. The information processing apparatus of claim 12, wherein the processor is configured to calculate the coefficient by applying Partial Least Squares (PLS) regression.

14. A system comprising:

the information processing apparatus of claim 1, and the signal emission source.

15. The system of claim 14, further comprising the moving vehicle.

16. The information processing apparatus of claim 1, wherein the processor is configured to set an area where the index continuously exceeds a predetermined value as the target area.

17. A non-transitory computer-readable storage medium having stored thereon a program which is executed by a computer of an information apparatus, the program comprising instructions capable of causing the computer to execute of functions comprising:

control a moving vehicle to move on a route, via a signal emission source that emits radio waves;

acquiring, from the moving vehicle, a first received power of a radio wave emitted by the signal emission source and measured by the moving vehicle on the route, in a state in which a radio wave shield that blocks the radio waves is arranged at a first position;

acquiring, from the moving vehicle, a second received power of a radio wave emitted from the signal emission source and measured on the route by the moving vehicle, in a state in which the radio wave shield is not arranged at the first position; and setting a part of an area on the route as a target area used for processing related to control of the moving vehicle, based on an index related to fluctuation between the first received power and the second received power, wherein the index represents the fluctuation caused according to presence or absence of the radio wave shield, and is calculated for each of reference positions set on the route based on the first received power, the second received power and a value which varies depending on the presence or absence of the radio wave shield.

18. An information processing apparatus comprising a processor configured to:

control a moving vehicle to move on a route, via a signal emission source that emits radio waves;

acquire, from the moving vehicle, a first received power of a radio wave emitted by the signal emission source and measured by the moving vehicle on the route, in a state in which a radio wave shield that blocks the radio waves is arranged at a first position;

acquire, from the moving vehicle, a second received power of a radio wave emitted from the signal emission source and measured on the route by the moving vehicle, in a state in which the radio wave shield is not arranged at the first position; and set a part of an area on the route as a target area used for processing related to control of the moving vehicle, based on an index related to fluctuation between the first received power and the second received power, wherein the index includes Variable Influence on Projection (VIP).

* * * * *